US012362523B2

(12) United States Patent
Leung et al.

(10) Patent No.: US 12,362,523 B2
(45) Date of Patent: Jul. 15, 2025

(54) POWERED TREE CONSTRUCTION WITH ROTATION LIMITING

(71) Applicant: Polygroup Macau Limited (BVI), Tortola (VG)

(72) Inventors: Chi Yin Alan Leung, Apleichau (HK); Ricky Tong, Shenzhen (CN); Chi Kin Samuel Kwok, Shenzhen (CN); Chang-Jun He, Shenzhen (CN)

(73) Assignee: Polygroup Macau Limited (BVI), Tortola (VG)

(*) Notice: Subject to any disclaimer, the term of this patent is extended or adjusted under 35 U.S.C. 154(b) by 0 days.

(21) Appl. No.: 18/638,234

(22) Filed: Apr. 17, 2024

(65) Prior Publication Data

US 2024/0266789 A1 Aug. 8, 2024

Related U.S. Application Data

(63) Continuation of application No. 17/403,262, filed on Aug. 16, 2021, now Pat. No. 11,967,790, which is a continuation of application No. 16/732,112, filed on Dec. 31, 2019, now Pat. No. 11,095,078, which is a continuation of application No. 16/556,781, filed on (Continued)

(51) Int. Cl.

| | |
|---|---|
| ***H01R 24/38*** | (2011.01) |
| ***A47G 33/06*** | (2006.01) |
| ***H01R 13/10*** | (2006.01) |
| ***H01R 31/00*** | (2006.01) |

(Continued)

(52) U.S. Cl.

CPC ............ *H01R 24/38* (2013.01); *A47G 33/06* (2013.01); *H01R 13/10* (2013.01); *H01R 31/00* (2013.01); *H01R 33/06* (2013.01); *H01R 2103/00* (2013.01)

(58) Field of Classification Search

CPC ......... F21V 23/06; A47G 33/06; A41G 1/007; H01R 2103/00; H01R 24/38; H01R 35/04

See application file for complete search history.

(56) References Cited

U.S. PATENT DOCUMENTS 5,807,138 A * 9/1998 Guiol .................. H01R 9/0521 439/607.41

8,936,379 B1 * 1/2015 Chen ...................... A41G 1/007 362/567

(Continued)

*Primary Examiner* — Tracie Y Green

*Assistant Examiner* — Michael Chiang

(74) *Attorney, Agent, or Firm* — TROUTMAN PEPPER LOCKE LLP; Christopher C. Close, Jr.

(57) ABSTRACT

A power transfer system to facilitate the transfer of electrical power between tree trunk sections of an artificial tree is disclosed. The power transfer system can advantageously enable neighboring tree trunk sections to be electrically connected without the need to rotationally align the tree trunk sections. Power distribution subsystems can be disposed within the trunk sections. The power distribution subsystems can comprise a male end, a female end, or both. The male ends can have prongs and the female ends can have voids. The prongs can be inserted into the voids to electrically connect the power distribution subsystems of neighboring tree trunk sections. In some embodiments, the prongs and voids are designed so that the prongs of one power distribution subsystem can engage the voids of another power distribution subsystem without the need to rotationally align the tree trunk sections.

16 Claims, 18 Drawing Sheets

Related U.S. Application Data

Aug. 30, 2019, now Pat. No. 10,985,513, which is a continuation of application No. 16/185,836, filed on Nov. 9, 2018, now Pat. No. 10,404,019, which is a continuation of application No. 15/911,676, filed on Mar. 5, 2018, now Pat. No. 10,777,949, which is a continuation of application No. 15/297,729, filed on Oct. 19, 2016, now Pat. No. 9,912,109, which is a continuation of application No. 14/621,507, filed on Feb. 13, 2015, now Pat. No. 9,119,495, which is a continuation of application No. 14/547,505, filed on Nov. 19, 2014, now Pat. No. 8,959,810, which is a continuation of application No. 14/090,470, filed on Nov. 26, 2013, now Pat. No. 9,843,147, which is a continuation of application No. 13/659,737, filed on Oct. 24, 2012, now Pat. No. 8,863,416.

(60) Provisional application No. 61/552,944, filed on Oct. 28, 2011.

(51) Int. Cl.

| | |
|---|---|
| ***H01R 33/06*** | (2006.01) |
| *H01R 103/00* | (2006.01) |

(56) References Cited

U.S. PATENT DOCUMENTS

| | | | | |
|---|---|---|---|---|
| 11,799,251 | B2 * | 10/2023 | Leung | H01R 31/00 |
| 11,967,790 | B2 * | 4/2024 | Leung | A47G 33/06 |
| 2012/0201597 | A1 * | 8/2012 | Comerford | E04C 5/18<br>403/306 |

* cited by examiner

POWERED TREE CONSTRUCTION WITH ROTATION LIMITING

CROSS-REFERENCE TO RELATED APPLICATION AND PRIORITY CLAIM

This application is a continuation of U.S. patent application Ser. No. 17/403,262, filed 16 Aug. 2021, entitled "Powered Tree Construction", which is a continuation of U.S. patent application Ser. No. 16/732,112, filed 31 Dec. 2019, entitled "Powered Tree Construction", which is a continuation of U.S. patent application Ser. No. 16/556,781, filed 30 Aug. 2019, entitled "Powered Tree Construction", which is a continuation of U.S. patent application Ser. No. 16/185,836, filed 9 Nov. 2018, entitled "Powered Tree Construction", which is a continuation of U.S. patent application Ser. No. 15/911,676, filed 5 Mar. 2018, entitled "Powered Tree Construction", which is a continuation of U.S. patent application Ser. No. 15/297,729, filed 19 Oct. 2016, now U.S. Pat. No. 9,912,109, entitled "Powered Tree Construction", which is a continuation of U.S. patent application Ser. No. 14/621,507, filed 13 Feb. 2015, now U.S. Pat. No. 9,119,495, entitled "Powered Tree Construction", which is a continuation of U.S. patent application Ser. No. 14/547,505, filed 19 Nov. 2014, now U.S. Pat. No. 8,959, 810, entitled "Powered Tree Construction," which claims the benefit of U.S. patent application Ser. No. 14/090,470, filed 26 Nov. 2013, now U.S. Pat. No. 9,843,147, entitled "Powered Tree Construction," which claims the benefit of U.S. patent application Ser. No. 13/659,737, filed 24 Oct. 2012, now U.S. Pat. No. 8,863,416, entitled "Powered Tree Construction," which claims the benefit of U.S. Provisional Patent Application No. 61/552,944, filed 28 Oct. 2011, entitled "Powered Tree Construction." The entire contents and substance of all of the above applications are incorporated herein by reference in their entirety as if fully set forth below.

FIELD OF THE INVENTION

Embodiments of the present invention relate generally to power transfer systems, and, more particularly, to power transfer systems for use with artificial trees, such as artificial Christmas trees.

BACKGROUND

As part of the celebration of the Christmas season, many people traditionally bring a pine or evergreen tree into their home and decorate it with ornaments, lights, garland, tinsel, and the like. Natural trees, however, can be quite expensive and are recognized by some as a waste of environmental resources. In addition, natural trees can be messy, leaving both sap and needles behind after removal, and requiring water to prevent drying out and becoming a fire hazard. Each time a natural tree is obtained it must be decorated, and at the end of the Christmas season the decorations must be removed. Because the needles have likely dried and may be quite sharp by this time, removal of the decorations can be a painful process. In addition, natural trees are often disposed in landfills, further polluting these overflowing environments.

To overcome the disadvantages of a natural Christmas tree, yet still incorporate a tree into the holiday celebration, a great variety of artificial Christmas trees are available. For the most part, these artificial trees must be assembled for use and disassembled after use. Artificial trees have the advantage of being usable over a period of years and thereby eliminate the annual expense of purchasing live trees for the short holiday season. Further, they help reduce the chopping down of trees for a temporary decoration, and the subsequent disposal, typically in a landfill, of same.

Generally, artificial Christmas trees comprise a multiplicity of branches each formed of a plurality of plastic needles held together by twisting a pair of wires about them. In other instances, the branches are formed by twisting a pair of wires about an elongated sheet of plastic material having a large multiplicity of transverse slits. In still other artificial Christmas trees, the branches are formed by injection molding of plastic.

Irrespective of the form of the branch, the most common form of artificial Christmas tree comprises a plurality of trunk sections connectable to one another. For example, in many designs, a first and second trunk section each comprise an elongate body. A first end of the body includes a receiving portion (e.g., a female end) and a second end of the body includes an extending portion (e.g., a male end). Typically, the body is a cylinder. Near the second end the body tapers slightly to reduce the diameter of the body. In other words, the diameter of the first end, i.e., the receiving portion, is larger than the diameter of the second end, i.e., the extending portion. To connect the trunk sections, the first end of a first trunk sections receives the second end of a second trunk sections. For example, the tapered end of the first trunk section is inserted into the non-tapered end of the second trunk section. In this manner, a plurality of trunk sections can be connected and a tree assembled.

One difficulty encountered during assembly, however, is the rotational alignment of the trunk sections. In some designs, the trunk sections comprise electrical systems. The electrical systems allow electricity to flow through the trunk of the tree and into accessories that can be plugged into outlets disposed on the trunk. To connect neighboring trunk sections, however, electrical prongs of one trunk section must be rotationally aligned with, and inserted into, electrical slots in another trunk section. This alignment process can be frustrating because it can be difficult for a user to judge whether the prongs will engage the slots when trunk sections are joined together. It may therefore take several attempts before a user can electrically connect two trunk sections.

What is needed, therefore, is a power transfer system for an artificial tree that allows a user to connect neighboring tree trunk sections without the need to rotationally alight the trunk sections. Embodiments of the present invention address this need as well as other needs that will become apparent upon reading the description below in conjunction with the drawings.

BRIEF SUMMARY

Briefly described, embodiments of the present invention comprise a power transfer system to facilitate the transfer of electrical power between tree trunk sections of an artificial tree. The power transfer system can advantageously enable neighboring tree trunk sections to be electrically connected without the need to rotationally align the tree trunk sections during assembly. Embodiments of the present invention can therefore facilitate assembly of an artificial tree, reducing user frustration during the assembly process.

In some embodiments, the power transfer system can comprise a first power distribution subsystem disposed within a first trunk section of an artificial tree. The power transfer system can further comprise a second power distribution subsystem disposed within a second trunk section of an artificial tree. The first power distribution subsystem can comprise a male end with electrical prongs and the second power distribution subsystem can comprise a female end with electrical voids. The prongs can be inserted into the voids to conduct electricity between the power distribution subsystems, and, therefore, between the trunk sections of the tree.

To enable neighboring tree trunk sections to be electrically connected without the need to rotationally align the tree trunk sections, the male end can comprise a central prong and a channel prong. Likewise, the female end can comprise a central void and a channel void. The central void can be located proximate the center of the female end, and the channel void can be a circular void disposed around the central void. When the trunk sections are joined, the central prong can be inserted into the central void. Similarly, the channel prong can be inserted into the channel void. However, because the channel void is circular, the channel prong can be inserted into the channel void in a variety of locations around the channel void. Accordingly, the male end can engage the female end in a variety of rotational configurations, and each configuration can provide a different rotational alignment between the first trunk section and the second trunk section. More specifically, the first trunk section can electrically engage the second trunk section regardless of the rotational relationship between the two sections.

Embodiments of the present invention can comprise an artificial tree comprising a plurality of tree trunk sections. The trunk sections can form a trunk of the artificial tree. A first power distribution subsystem can be disposed within an inner void of a first trunk section of the plurality of tree trunk sections, and the first power distribution subsystem can comprise a male having a central prong and a channel prong. A second power distribution subsystem can be disposed within an inner void of a second trunk section of the plurality of tree trunk sections, and the second power distribution subsystem can comprise a female end having a central void and a channel void. In some embodiments, the central prong of the male end can be configured to engage the central void of the female end and the channel prong of the male end can be configured to engage the channel void of the female end to conduct electricity between the first power distribution subsystem and the second power distribution subsystem.

In some embodiments, the channel prong of the male end can be configured to engage the channel void of the female end at a plurality of locations. In some embodiments, the channel prong of the male end can be configured to engage the channel void of the female end in a plurality of configurations, and each configuration can provide a different rotational alignment between the first trunk section and the second trunk section.

In some embodiments, the channel void of the female end can be substantially circular. The central void of the female end can be disposed proximate the center of the substantially circular channel void.

In some embodiments, a safety cover can obstruct access to the channel void.

In some embodiments, the central prong of the male end can engage a central contact device, and the central contact device can comprise one or more flexible contact sections that abut the central prong.

In some embodiments, an outlet can be disposed on a trunk section, and the outlet can be configured to provide electrical power to a strand of lights.

In some embodiments, alignment mechanisms can prevent the first trunk section from rotating with respect to the second trunk section.

In some embodiments, the first trunk section can comprise an inner sleeve proximate an end of the first trunk section, and the second trunk section can comprise an outer sleeve proximate an end of the second trunk section. The inner sleeve can be configured to engage the outer sleeve. In some embodiments, two or more pivot areas can be between the inner sleeve and the outer sleeve to substantially prevent the first trunk section from rocking with respect to the second trunk section.

In some embodiments, a power cord can be configured to engage a wall outlet and provide power to the first power distribution subsystem and the second power distribution subsystem.

Embodiments of the present invention can further comprise a system for connecting tree trunk sections of an artificial tree. The system can comprise a first power distribution subsystem having a male end, and the male end can have one or more electrical prongs. The system can further comprise a second power distribution subsystem having a female end, and the female end can have one or more electrical voids. In some embodiments, the one or more electrical prongs of the first power distribution subsystem can engage one or more electrical voids of the second power distribution subsystem to conduct electricity between the first power distribution subsystem and the second power distribution subsystem. In some embodiments, the one or more electrical prongs of the first power distribution subsystem can engage one or more electrical voids of the second power distribution subsystem in a plurality of configurations, and each configuration can provide a different rotational alignment between the first power distribution subsystem and the second power distribution subsystem.

In some embodiments, a first electrical void of the female end can be a circular channel void.

In some embodiments, a second electrical void of the female end can be a central void located proximate the center of the female end.

In some embodiments, an electrical prong of the male end can engage the circular channel void at a plurality of locations around the circular channel void.

Embodiments of the present invention can further comprise a connector system for electrically connecting a plurality of power distribution subsystems of a plurality of tree trunk sections that form an artificial tree. The connector system can comprise a male end disposed on an end of a first tree trunk section of the plurality of tree trunk sections, and the male end can have a central prong and a channel prong. The connector system can further comprise a female end disposed on an opposite end of the first tree trunk section. The female end can have a central receiving void that can be located proximate the center of the female end and a channel receiving that can be substantially round and disposed axially around the central receiving void.

In some embodiments, a safety cover can obstruct access to the channel void. In some embodiments, the safety cover can be depressed to enable access to the channel void.

In some embodiments, the male end and the female end can comprise one or more clutch elements, and the one or more clutch elements can be configured to prevent the male end from rotating with respect to the female end.

In some embodiments, the central receiving void can comprise a central contact device, and the central contact device can have one or more flexible contact sections that can be configured to abut an electrical prong.

The foregoing summarizes only a few aspects of the present invention and is not intended to be reflective of the full scope of the present invention. Additional features and advantages of the present invention are set forth in the following detailed description and drawings, may be apparent from the detailed description and drawings, or may be learned by practicing the present invention. Moreover, both the foregoing summary and following detailed description are exemplary and explanatory and are intended to provide further explanation of the presently disclosed invention as claimed.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAILED DESCRIPTION

Figure 1:
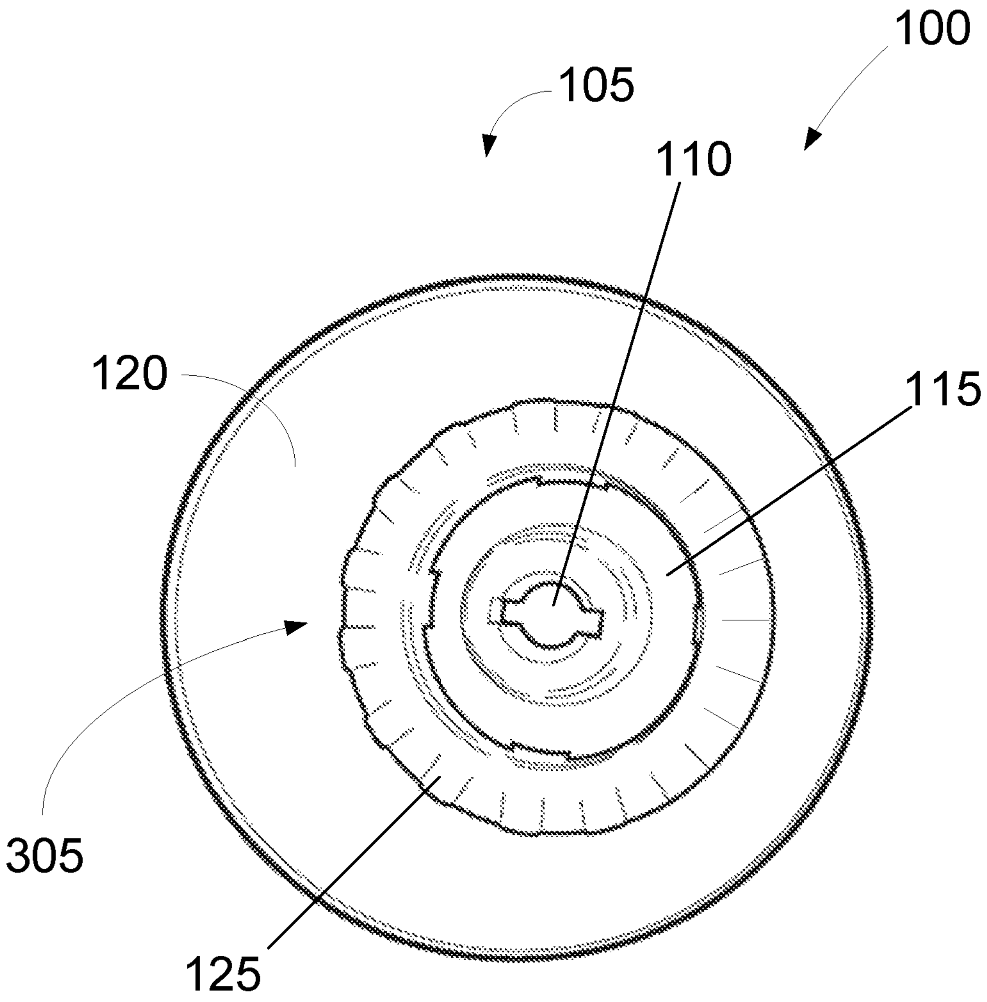
FIG. 1 depicts a perspective view of a female end of a tree trunk section, in accordance with some embodiments of the present invention.

Although preferred embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity.

It should also be noted that, as used in the specification and the appended claims, the singular forms "a," "an" and "the" include plural references unless the context clearly dictates otherwise. References to a composition containing "a" constituent is intended to include other constituents in addition to the one named.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

The components described hereinafter as making up various elements of the invention are intended to be illustrative and not restrictive. Many suitable components that would perform the same or similar functions as the components described herein are intended to be embraced within the scope of the invention. Such other components not described herein can include, but are not limited to, for example, similar components that are developed after development of the presently disclosed subject matter.

To facilitate an understanding of the principles and features of the invention, various illustrative embodiments are explained below. In particular, the presently disclosed subject matter is described in the context of being an artificial tree power system. The present invention, however, is not so limited, and can be applicable in other contexts. For example and not limitation, some embodiments of the present invention may improve other power systems, such as light poles, lamps, extension cord systems, power cord connection systems, and the like. These embodiments are contemplated within the scope of the present invention. Accordingly, when the present invention is described in the context of a power transfer system for an artificial Christmas tree, it will be understood that other embodiments can take the place of those referred to.

When assembling an artificial tree, decorators commonly desire to illuminate the tree with one or more light strings, i.e., strands of lights. The light strings require electrical power and are conventionally connected in series. In many designs, at least one of the light strings is connected to a wall outlet to provide power to all of the light strings. When decorating a tree, the decorator can walk around the tree, placing the light strings on various locations on the branches of the tree. In order to provide power to all of the light strings, typical light strings come with a first end in the form of a male end and a second end in the form of a female end.

To provide power to more than one light string, the decorator can insert the male end of one light string into the female end of another light string. In doing so, the light string that is electrically connected to a wall outlet (or other power outlet) transfers electrical energy from the outlet to subsequent light strings. In some conventional systems, the lights strings can have multiple points of electrical connectivity, providing for parallel or serial connectivity. Even so, the flow of power is usually from one light string connected to the power outlet to one or more downstream light strings.

The act of providing power from the outlet to one or more light strings can be cumbersome and frustrating for a decorator. In order to attach multiple light strings together, the decorator will either need to attach the light strings prior to their placement on the tree or attach the light strings after they have been placed on the tree. If the decorator attaches multiple light strings together, in order to "wrap" the tree with the light strings, the decorator often must walk around the tree, carrying the multiple strings. If the decorator waits until after the light strings are placed on the tree, the decorator will need to reach through the tree branches and electrically connect the light strings. The decorator would also likely need to manipulate the light strings in order to connect the strings together. This process can be difficult and can take an extended amount of time.

To alleviate issues associated with providing power to light strings in conventional artificial trees, and to provide further advantages, the present invention comprises a power transfer system for an artificial tree. In an exemplary embodiment, an artificial tree trunk comprises tree trunk sections that are engaged with one another to form the trunk of an artificial tree. At least some of the tree trunk sections can have hollow voids. Within the hollow voids can be power distribution subsystems. In some embodiments, power distribution subsystem can comprise a female end, a male end, or both located proximate the ends of the tree trunk sections. In some embodiments, when one tree trunk section is engaged with another tree trunk section, the male end of one power distribution subsystem engages with and is electrically connected to the female end of a neighboring power distribution subsystem. Thus, by electrically connecting a power distribution subsystem of a tree trunk section to a power outlet, electrical power flows from the outlet to that tree trunk section, and from that tree trunk section to other tree trunk sections.

A variety of systems exist to facilitate joining the male and female ends of power distribution subsystems. Although conventional plug and outlet systems can be used, such as those manufactured in accordance with NEMA standards, in some cases, it can be difficult in conventional designs to align the male prongs of one tree trunk section with the female holes of another tree trunk section. In order to engage the male end with the female end, the assembler of the tree often must vertically align the tree trunk sections so that the male prongs of the male end are not angled to the female end in a manner that prevents insertion of the male prongs. The assembler must also rotationally align the two tree trunk sections to allow the prongs to line up with the female holes. Even if the tree trunk sections are perfectly vertical, in conventional systems, the male prongs can only engage the female holes if the male prongs are rotationally aligned with the female holes. If not, the male prongs abut the area around the female holes, which prevents insertion of the male prongs. Attempting to align the male prongs and the female holes can therefore take significant time, and can be a frustrating experience for a user.

To alleviate this problem, in one embodiment, the present invention comprises a female end having a central void for receiving a first male prong of the male end and a channel void disposed around the central void for receiving a second male prong. In this configuration, the assembler of the tree trunk sections can be less concerned with the rotational, or angular, displacement of the two tree trunk sections, as the channel provides for engagement with the male end at various angular displacements. In exemplary embodiments, the channel is disposed 360 degrees around the central void so that, regardless of the angular displacement between the tree trunk sections, the male prongs can engage the female voids. This can make the assembly process much easier and more enjoyable for a user.

Embodiments of the present invention can also be used in a variety of systems. For example, some embodiments can be used in low voltage systems, and other embodiments can be used in normal, higher voltage systems.

Referring now to the figures, wherein like reference numerals represent like parts throughout the views, exemplary embodiments will be described in detail.

FIG. 1 depicts an exemplary embodiment of a female end 105 of a power distribution subsystem 305 of a tree trunk section 100. In some embodiments, female end 105 can have one or more electrical voids for receiving power from, or distributing power to, a male end of a power distribution subsystem 305 of a tree trunk section 100. Female end 105 can comprise central receiving void 110 for engaging with a prong of a male end and channel receiving void 115 for engaging with another prong of a male end.

In some embodiments, the voids 110, 115 can be hollows or apertures that receive and engage with other electrical connectors, such as prongs, and enable the electrical connectors to conduct electrical power through the trunk of the tree. In some embodiments, the central receiving void 110 can be located proximate the center of the female end 105.

The channel receiving void 115, therefore, can be a round or circular channel that encircles the central receiving void 110. Accordingly, the central receiving void 110 can be located proximate the center of the channel receiving void 115.

Figure 2:
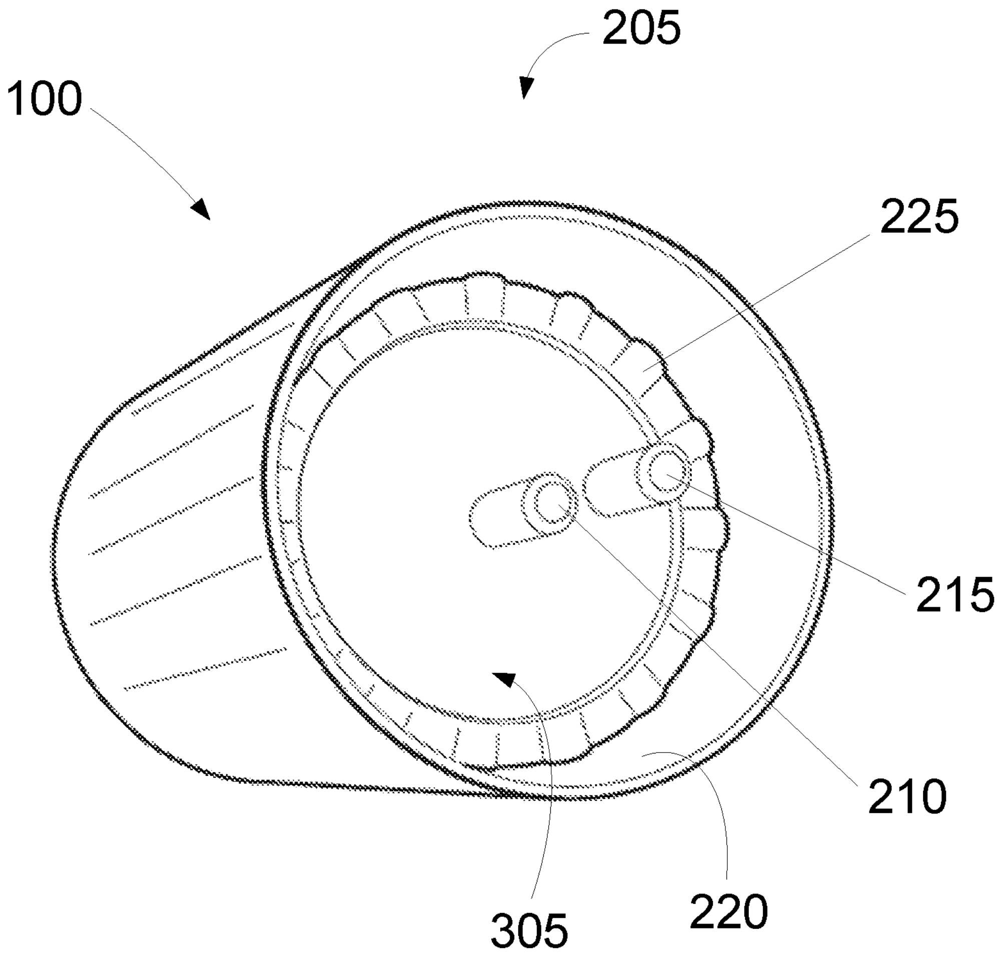
FIG. 2 depicts a perspective view of a male end of a tree trunk section, in accordance with some embodiments of the present invention.

FIG. 2 depicts an exemplary embodiment of a male end 205 of a power distribution subsystem 305 of a tree trunk section 100. In some embodiments, male end 205 can have one or more prongs for receiving power from, or distributing power to, a female end 105 of a power distribution subsystem 305 of a tree trunk section 100. In some embodiments, the male end 205 comprises two prongs. A first prong can provide a "positive" flow path for electricity and a second prong can provide a "negative" flow path for electricity.

As shown in FIG. 2, male end 205 can have a central male prong 210 and a channel male prong 215. In some embodiments, central male prong 210 can be sized and shaped to fit inside of and engage central receiving void 110, and channel male prong 215 can be sized and shaped to fit inside of and engage channel receiving void 115. In some embodiments, when central male prong 210 and channel male prong 215 of the male end 205 are inserted into the central receiving void 110 and channel receiving void 115 of the female end 105, respectively, electrical power can be conducted from male end 205 to female end 105, or vice versa, depending on the direction of electrical power flow. In this manner, electrical power can be conducted from a first power distribution 305 subsystem to a second power distribution subsystem 305.

As shown in FIGS. 1 and 2, by having channel receiving void 115 disposed in a circular manner around central receiving void 110 of female end 105, assembly issues concerning the angular relationship (i.e., rotational alignment) of male end 205 and female end 105 can be reduced or eliminated. In other words, central male prong 210 can be located in the center of the male end 205, and central receiving void 210 can be located in the center of female end 105, enabling central male prong 210 and central receiving void 210 to line up regardless of the rotational alignment of the male end 205 and female end 105. In addition, channel male prong 215 of male end 205 can be inserted at a plurality of locations along channel receiving void 115 of female end 105, and still establish and maintain electrical connectivity between female end 105 and male end 205. More particularly, the channel prong 215 can engage the channel receiving void 115 in a plurality of configurations, and each configuration can provide a different rotational alignment between the two trunk sections 100. This design enables the male end 205 and the female end 105 to electrically engage regardless of the angular relationship, or rotational alignment, between the male end 205 and the female end 105.

In some embodiments, therefore, the angular displacement between connecting trunk sections 100 is not problematic during assembly because the trunk sections 100 can be joined at any number of angular displacements. Thus, a person assembling a Christmas tree utilizing an embodiment of the present invention can more readily assemble the various trunk sections 100 without having to rotationally align male end 205 with female end 105.

In addition, because some embodiments of the present invention allow rotation while assembled, the assembler of the Christmas tree can rotate the various trunk sections to some degree after assembly to achieve a desired appearance. However, in some embodiments, as shown in FIGS. 1 and 2, the male end 205 and the female end 105 can comprise one or more alignment mechanisms 125, 225. The alignment mechanism 125, 225 can comprise ridges and grooves, or similar structures such as detents, bumps, or teeth. In some embodiments, the ridges and grooves of the alignment mechanism 125 of the female end 105 and the ridges and grooves of the alignment mechanism 225 of the male end 205 can engage when the female end 105 and the male end 205 join together. This engagement can prevent the trunk sections 100 from rotating with respect to one another. Preventing rotation can be advantageous to a user who desires to prevent portions of a tree from rotating after assembly, such as when the user decorates the tree with lights and other accessories.

In some embodiments, central male prong 210 and/or channel male prong 215 can be spring loaded. For example, when male end 205 is physically disconnected from female end 105, central male prong 210 and/or channel male prong 215 can be recessed or retracted. Likewise, when male end 205 is physically connected to female end 105, central male prong 210 and/or channel male prong 215 can be extended, by spring action, to provide for electrical connectivity. Employing spring loaded prongs 210, 215 can help to reduce wear and tear on the prongs 210, 215 and can also help to reduce the likelihood of electrical shock when central male prong 210 and/or channel male prong 215 are energized.

Embodiments of the present invention can comprise a central receiving void 110 and/or a channel receiving void 115 with spring loaded safety covers. More specifically, the central receiving void 110 and/or a channel receiving void 115 can have one or more covers that obstruct access to the voids when they are not engaged with prongs of a male end 205. In this manner, the safety covers can prevent a user from unintentionally inserting a finger or other object into the voids and receiving an electric shock. The covers can be spring loaded so that they can be depressed by the prongs of the male end 205 as the male end 205 and the female end 105 are joined.

In some embodiments, it can be desirable to have a guide system, such as a sleeve system, that assists the assembler in aligning the various tree trunk sections with each other during assembly. In some embodiments, a sleeve system can also help secure the tree trunk sections to each other when assembled, and can prevent the assembled tree from swaying or wobbling.

FIG. 1 shows outer sleeve 120 and FIG. 2 shows inner sleeve 220 of a sleeve system. As shown in FIGS. 1 and 2, the outer sleeve 120 is disposed proximate the female end 105 and the inner sleeve 220 is disposed proximate the male end 205. However, in some embodiments, the outer sleeve 120 is disposed proximate the male end 205 and the inner sleeve 220 is disposed proximate the female end 105.

When an assembler is joining female end 105 to male end 205, and thus joining their respective tree trunk sections 100, outer sleeve 120 and inner sleeve 220 can engage and act as guides to help bring the two tree trunk sections 100 together. Moreover, the use of a sleeve system, such as outer sleeve 120 and inner sleeve 220, can provide additional benefits. For example, the inner diameter of outer sleeve 120 can be the same size, or nearly the same size, as the outer diameter of inner sleeve 220 to provide for a secure fit between female end 105 and male end 205. This can help provide lateral support to the tree trunk sections 100, reducing the likelihood that a force applied to one of the tree trunk sections 100 will cause the tree trunk sections 100 to separate. An exemplary sleeve system can be found in co-pending U.S. patent application Ser. No. 12/982,015, entitled, "Connector System," the contents of which are hereby incorporated by reference.

Figure 3A:
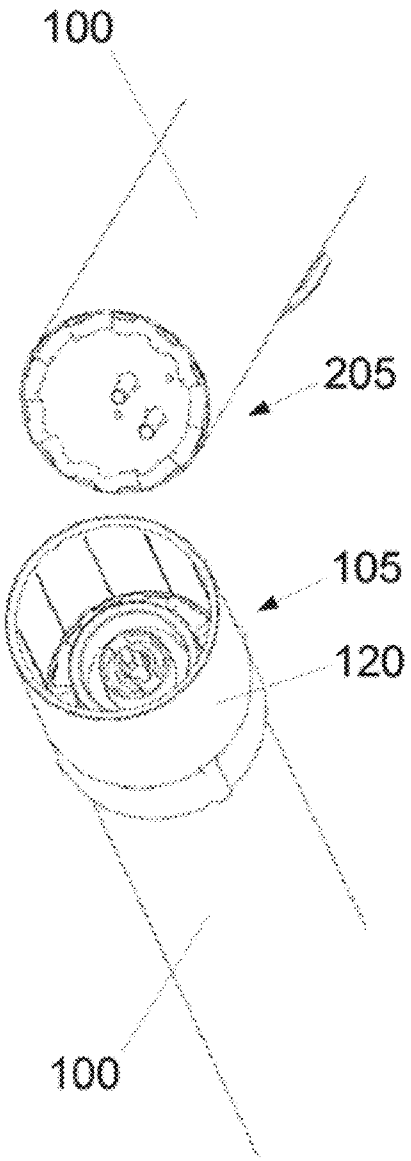
FIG. 3*a* depicts a perspective view of a female end of a tree trunk section in proximity to a male end of a tree trunk section, in accordance with some embodiments of the present invention.
Figure 3B:
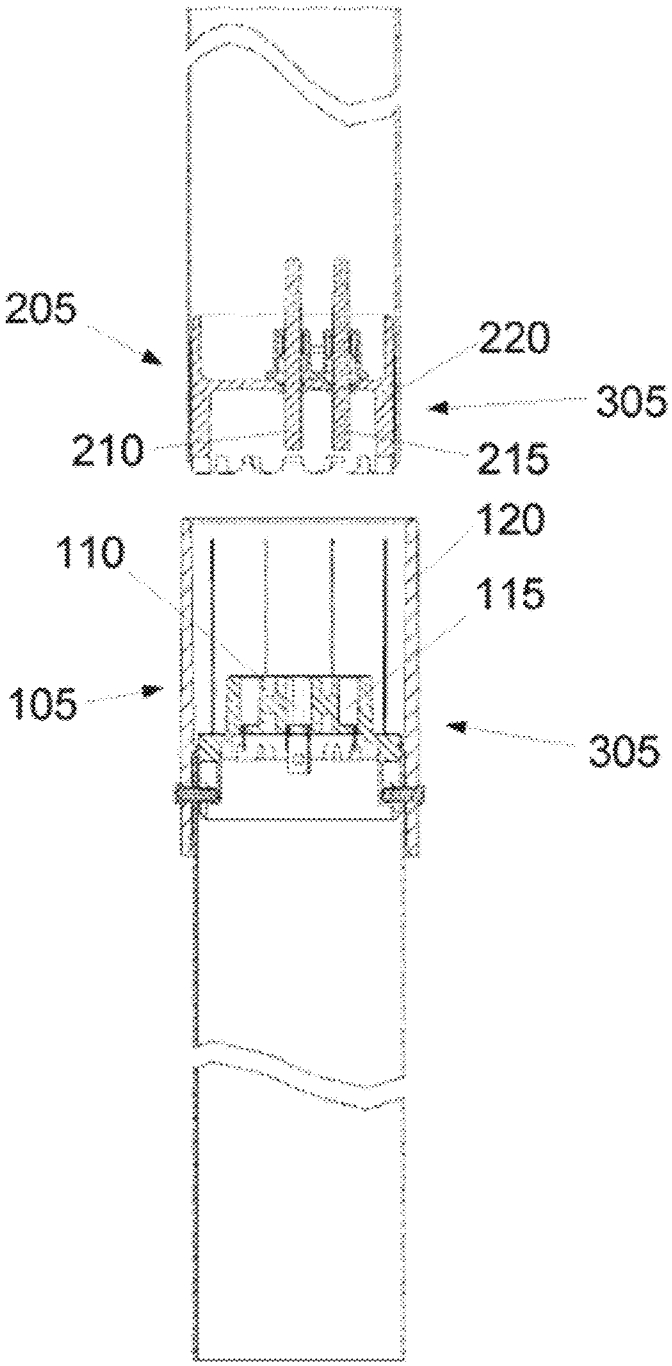
FIGS. 3*b-c* depict cross-sectional views of a female end of a tree trunk section being joined with a male end of a tree trunk section, in accordance with some embodiments of the present invention.
Figure 3C:
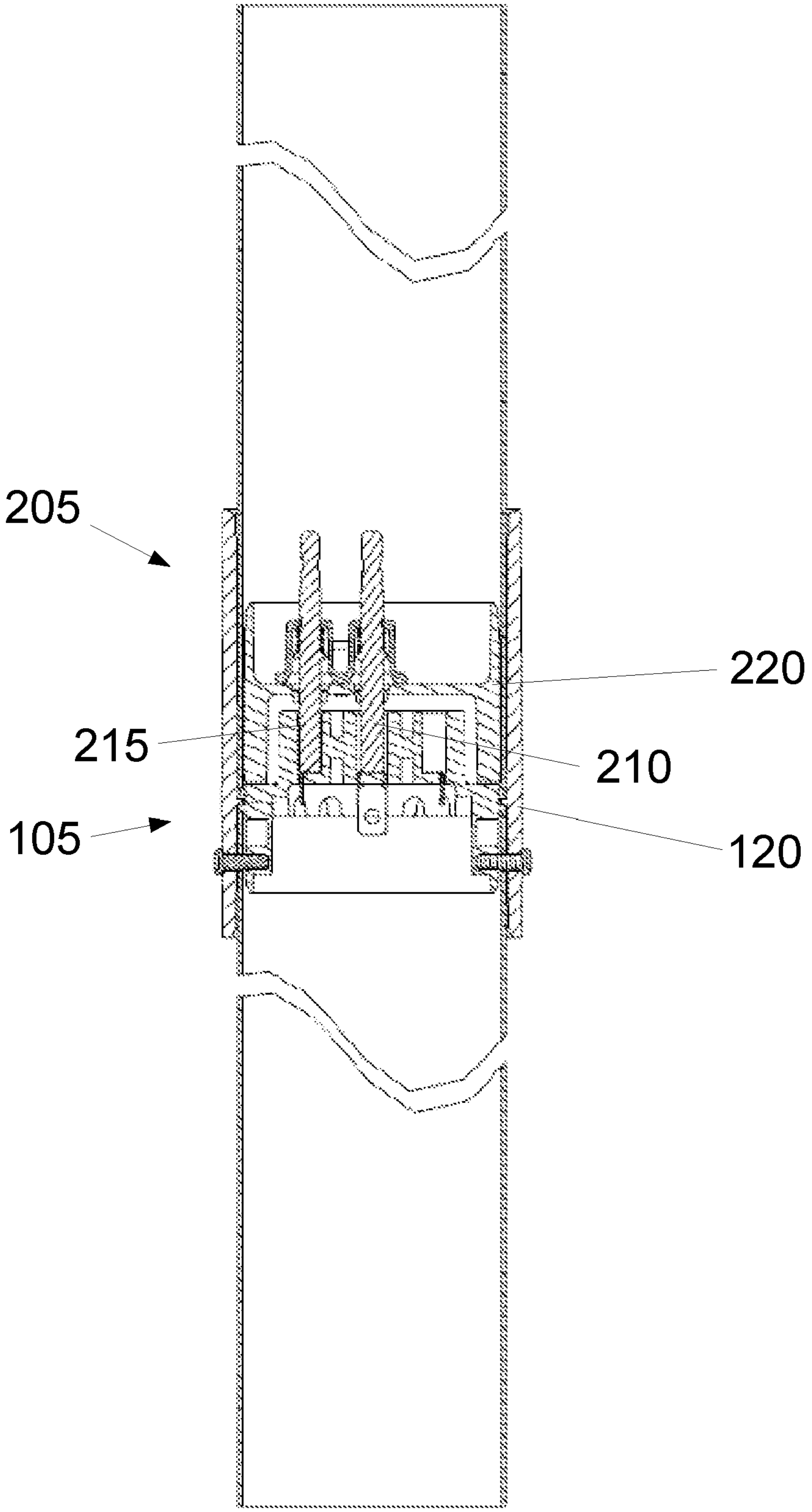

FIGS. 3*a-c* show the process of connecting a male end 205 of a power distribution subsystem 305 with a female end 105 of a power distribution subsystem 305. Referring to FIG. 3*a*, illustrated are male end 205 of a first tree trunk section 100 and female end 105 of a second tree trunk section 100 in a disconnected configuration. When assembling a tree, according to various embodiments of the present invention, a user can connect trunk sections 100 by connecting male end 205 with female end 105. More specifically, the user can vertically align the trunk sections 100, as shown in FIG. 3*b*, which is a cross-sectional view. Once vertically aligned, or at least sufficiently aligned to permit joining, the assembler can move one trunk section 100 closer to the other trunk section 100 until the trunk sections 100 engage and are joined, as shown in FIG. 3*c*. In doing so, the assembler has also joined male end 205 with female end 105, providing electrical connectivity between the two pictured trunk sections 100. More particularly, the central male prong 210 is inserted into central receiving void 110 and channel male prong 215 is inserted into channel receiving void 115, allowing electricity to flow between the male end 205 and the female end 105.

Figure 4A:
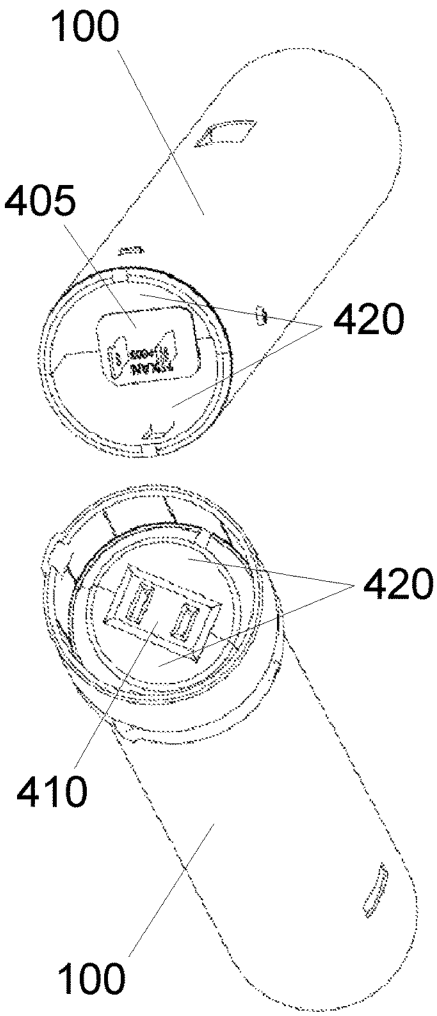
FIG. 4*a* depicts a perspective view of a female end of a tree trunk section in proximity to a male end of a tree trunk section, in accordance with some embodiments of the present invention.
Figure 4B:
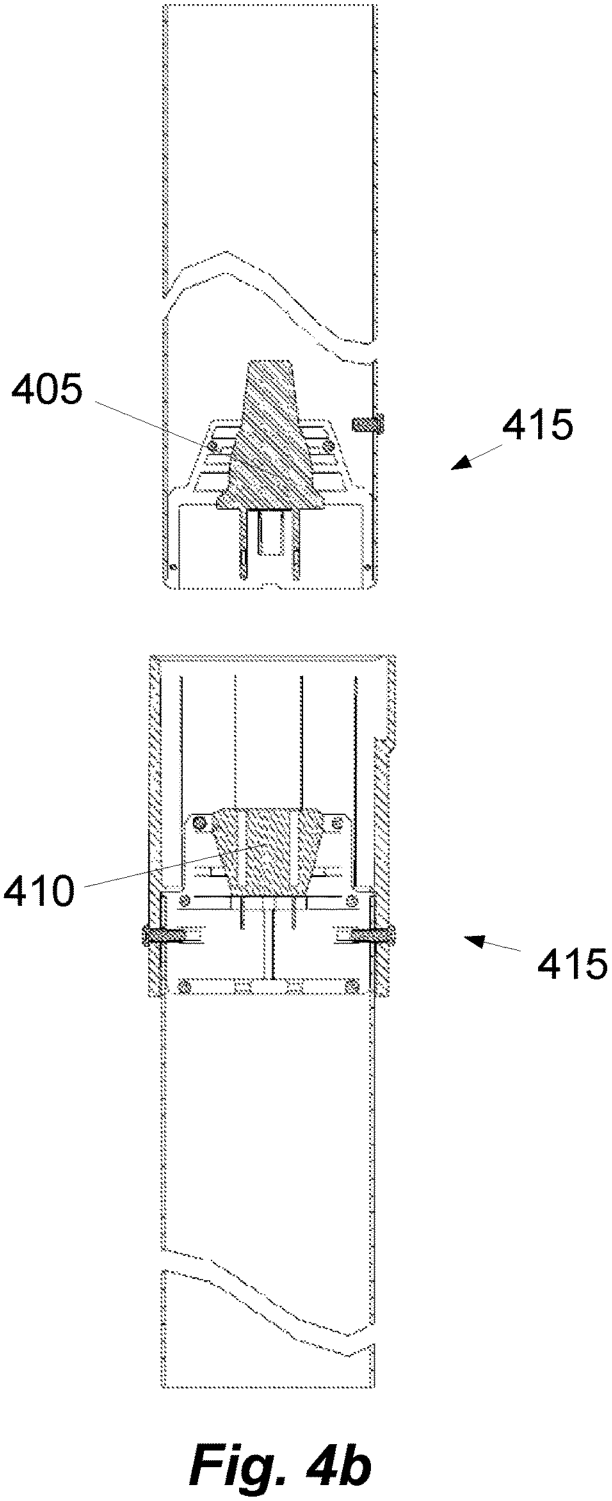
FIGS. 4*b-c* depict cross-sectional views of a female end of a tree trunk section being joined with a male end of a tree trunk section, in accordance with some embodiments of the present invention.
Figure 4C:
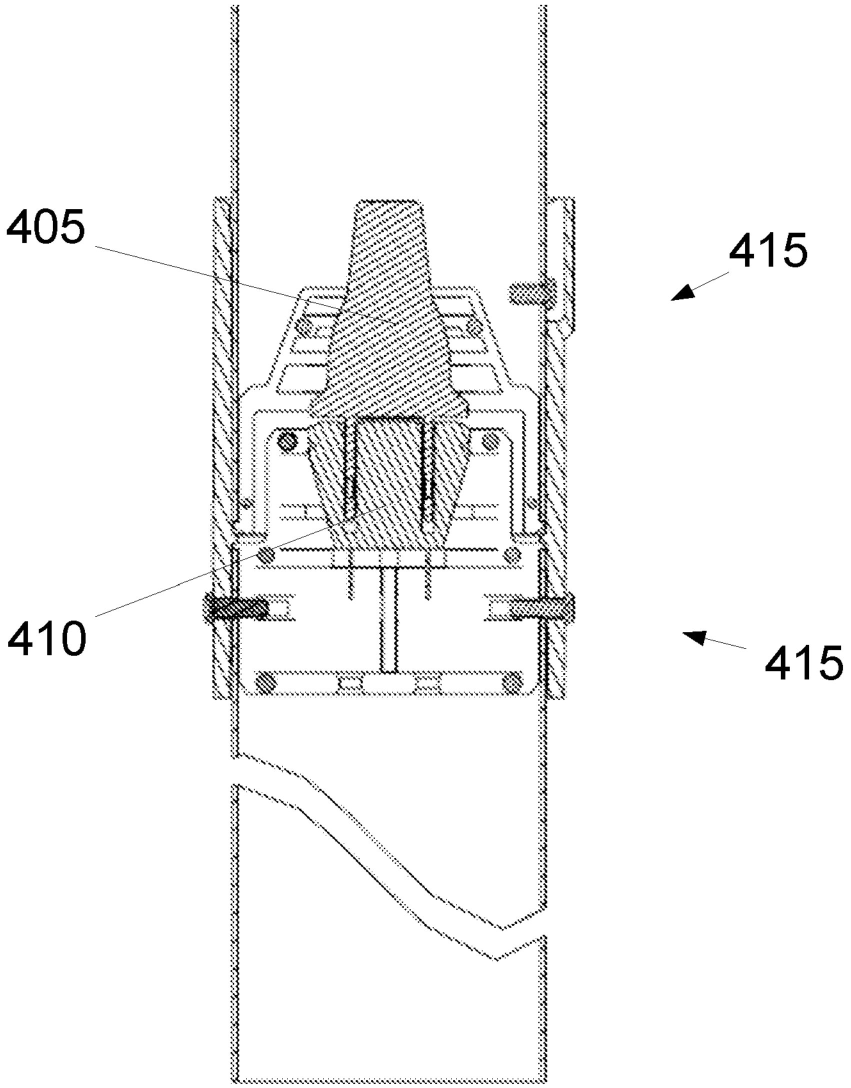

In some embodiments, flexibility in the rotational alignment of the tree trunk sections 100 is not needed or desired. In such a configuration, conventional electrical connectivity systems can be used. This is illustrated by way of example in FIGS. 4*a-c*. In some embodiments, as shown in FIGS. 4*a-b*, a common male plug 405 and/or female plug 410 can be incorporated into a power distribution subsystem 415. The male plug 405 and female plug 410 can be placed between plug retainers 420 that hold the plugs in place. The plugs can then be aligned, and the trunk sections connected such that the male prongs of the male plug 405 are inserted into the female voids of the female plug 410, as shown in FIG. 4*c*.

Figure 5:
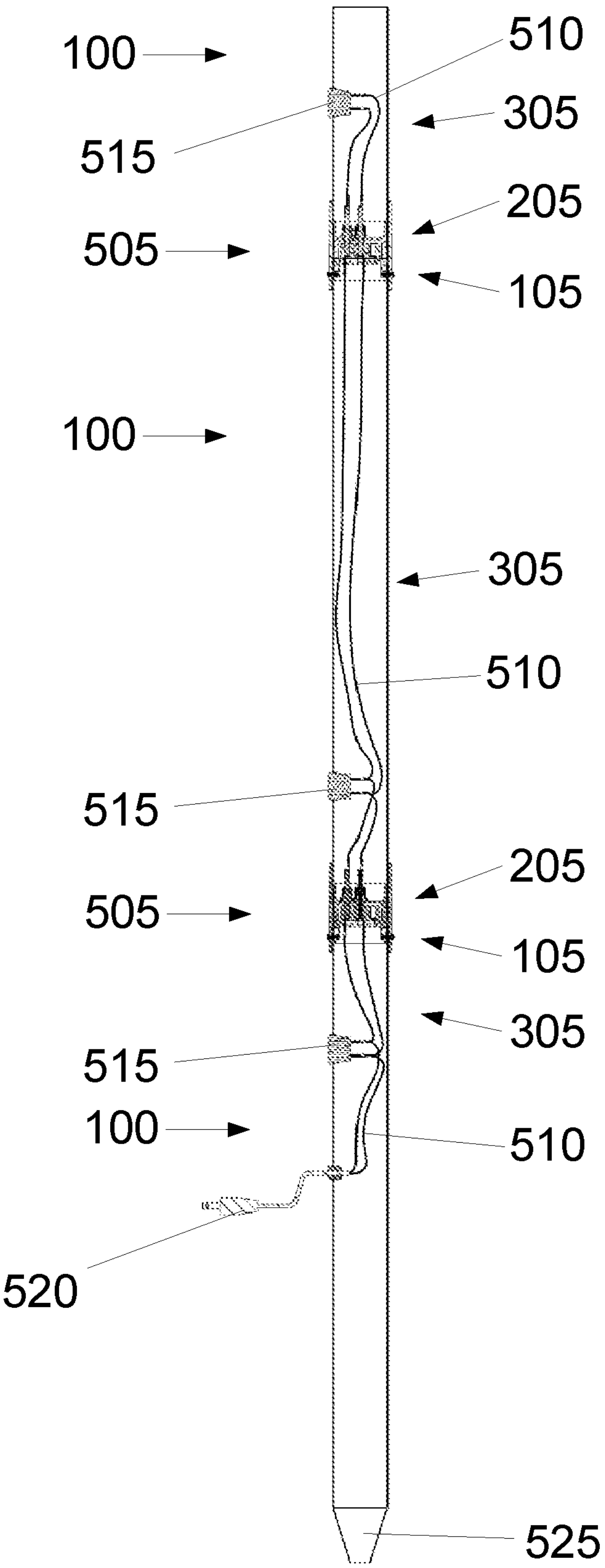
FIG. 5 depicts a cross-sectional view showing power distribution subsystems of an assembled tree trunk, in accordance with some embodiments of the present invention.

FIG. 5 shows a cross-section of an exemplary embodiment of the present invention. Shown are three trunk sections 100 and two connection areas 505. Connection areas 505 are areas where the female end 105 of a power distribution subsystem 305 of one trunk section 100 and the male end 205 of a power distribution subsystem 305 of another trunk section 100 join. Accordingly, the connection areas 505 are areas where trunk sections 100 are connected.

As shown in FIG. 5, a power distribution subsystem 305 can comprise a female end 105, a male end 205, and one or more electrical wires 510. The wires 510 enable electricity to flow through the trunk sections 100 and between the male and female ends 205, 105 of power distribution subsystems 305. Thus, the wires 510, as part of the power distribution subsystems 305, enable power to flow from a power source, such as a wall outlet, through the tree and to certain accessories, such as a one more lights or strands of lights. The lights or strands of lights can therefore be illuminated when power is supplied to the tree.

In some embodiments, it can be desirable to provide for one or more electrical outlets 515 on the trunk sections 100 along the length of the assembled tree. Thus, one or more power distribution subsystems 305 can comprise one or more electrical outlets 515. Outlets 515 can be configured to receive power from wires 510 to provide a user with the ability to plug in devices, such as tree lights or other electrical components. By providing a convenient location to plug in lights, outlets 515 can minimize the amount of effort required to decorate a tree. More specifically, a user can plug a strand of lights directly into an outlet 515 on a trunk section 100, instead of having to connect a series of strands together, which can be cumbersome and frustrating for a user.

Embodiments of the present invention can further comprise strands of lights that are unitarily integrated with the power transfer system. Thus, the lights can be connected to the wires 510 without the need for outlets 515, although outlets 515 can be optionally included. Such embodiments can be desirable for trees that come pre-strung with lights, for example.

In some embodiments, one or more trunk sections 100 can comprise a power cord 520 for receiving power from an outside power source, such as a wall outlet. The power cord 520 can be configured to engage a power source and distribute power to the rest of the tree. More specifically, power can flow from the wall outlet, through the power cord, through the one or more power distribution subsystems 305, and to accessories on the tree, such as lights or strands of lights. In some embodiments, the power cord 520 can be located on a lower trunk section 100 of the tree for reasons of convenience and appearance, i.e., the power cord 520 is close to the wall outlets and exits the tree at a location that is not immediately visible.

Embodiments of the present invention can also comprise a bottom section 525 of one or more trunk sections 100. The bottom section 525 can be substantially conical in shape, and can be configured to engage a stand for the tree (not shown). Accordingly, the bottom section 525 can be inserted into the stand, and the stand can support the tree, usually in a substantially vertical position.

In some embodiments, as shown in FIG. 5, it can be advantageous for a lowest trunk section 100 of a tree to comprise a female end 105 of a power distribution subsystem 305. During assembly, a male end 205 of a power distribution subsystem 305 of a neighboring trunk section 100 can be joined with the female end 105 of the lowest trunk section 100. This can improve safety during assembly because the exposed male prongs are not energized, i.e., they do not have electricity flowing through them until they are inserted into the female end 105. To the contrary, if the lowest trunk section comprises a male end 205, energized prongs can be exposed, and accidental electrical shock can result. Ideally, the power cord 520 is not plugged into a wall outlet until the tree is fully assembled, but embodiments of the present invention are designed to minimize the risk of injury if the tree is plugged in prematurely.

In addition, in some embodiments, all of the trunk sections 100 can be configured so that the female end 105 is the bottom end, and the male end 205 is the top end. In this manner, if the power cord is plugged in during assembly, the risk of injury is minimized because energized male prongs are not exposed.

Figure 6:
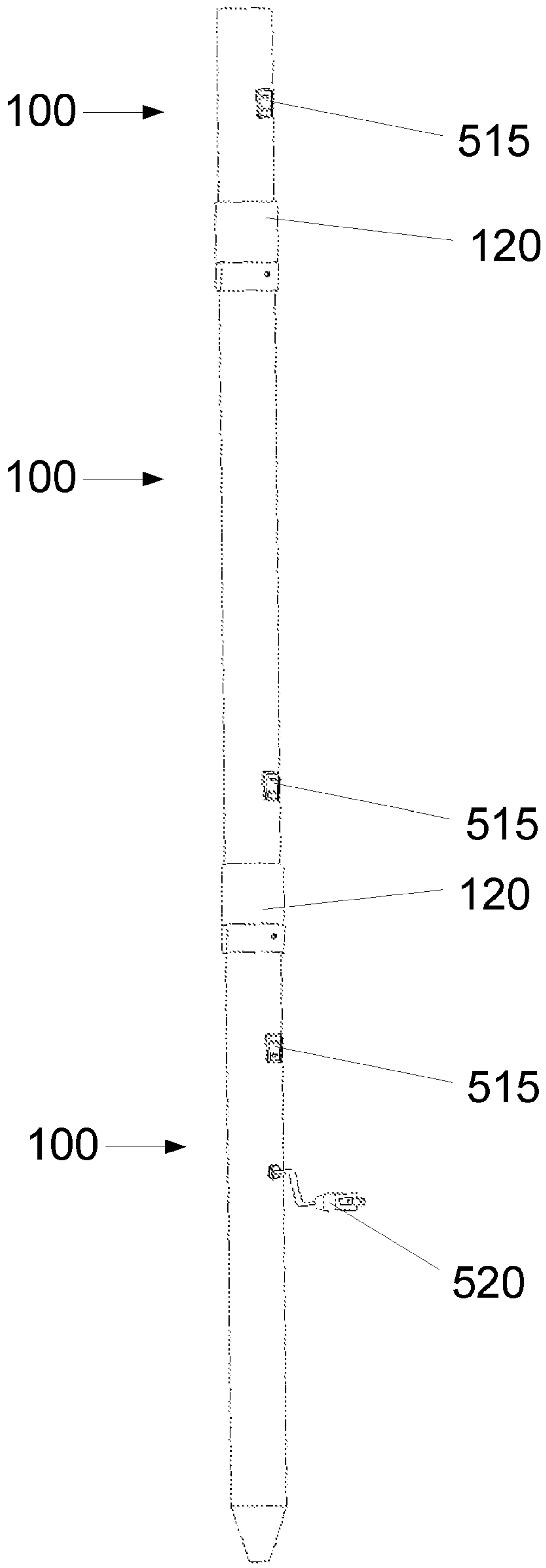
FIG. 6 depicts a side view of an assembled tree trunk, in accordance with some embodiments of the present invention.

FIG. 6 is an external, side view of an assembled tree trunk according to various embodiments of the present invention. Three tree trunk sections 100 are assembled and physically connected to one another to support the tree. As discussed previously, it can be desirable to use a sleeve system to secure one tree trunk section 100 to another tree trunk section 100, and outer sleeves 120 of the sleeve system are also shown in FIG. 6. Power outlets 515 and power cord 520 are also shown.

Other embodiments of the present invention can comprise additional features, different features, and/or different combinations of features than the embodiments described above. Some of these embodiments are described below.

Figure 7:
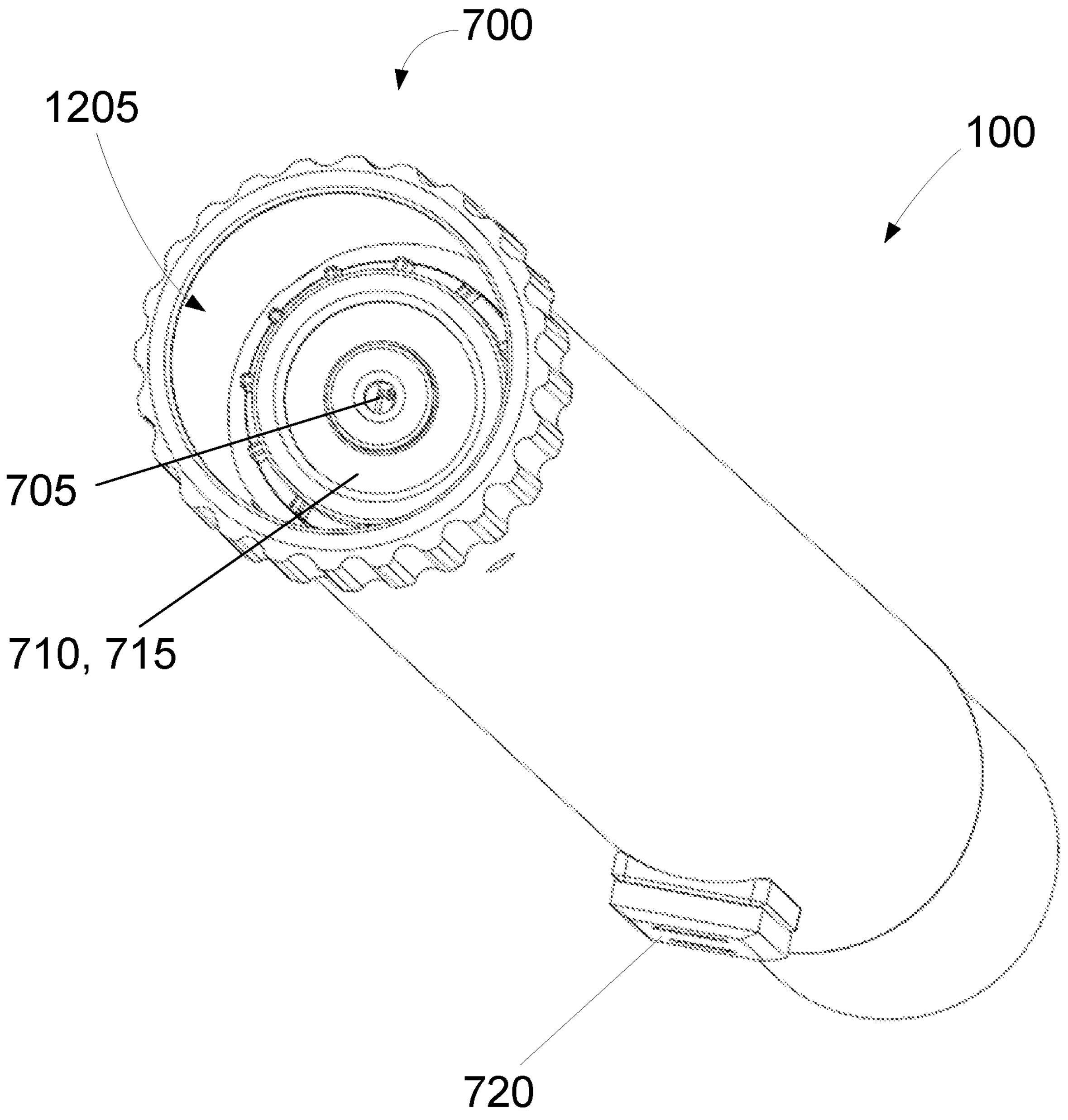
FIG. 7 depicts a perspective view of a female end of a tree trunk section, in accordance with some embodiments of the present invention.

FIG. 7 shows an exemplary embodiment of a female end 700 of a power distribution subsystem 1205 of a tree trunk section 100. Like previously described embodiments, female end 105 can have a one or more of power voids for receiving power from, or distributing power to, a male end of a tree trunk section 100. In the embodiment shown in FIG. 7, female end 700 can comprise central receiving void 705 for engaging with a prong of a male end and channel receiving void 710 for engaging with another prong of a male end. In some embodiments, the channel receiving void 710 can be protected by a safety cover 715 when it is not engaged with a prong of a male end. Outlet 720, as described above, is also shown.

Figure 8:
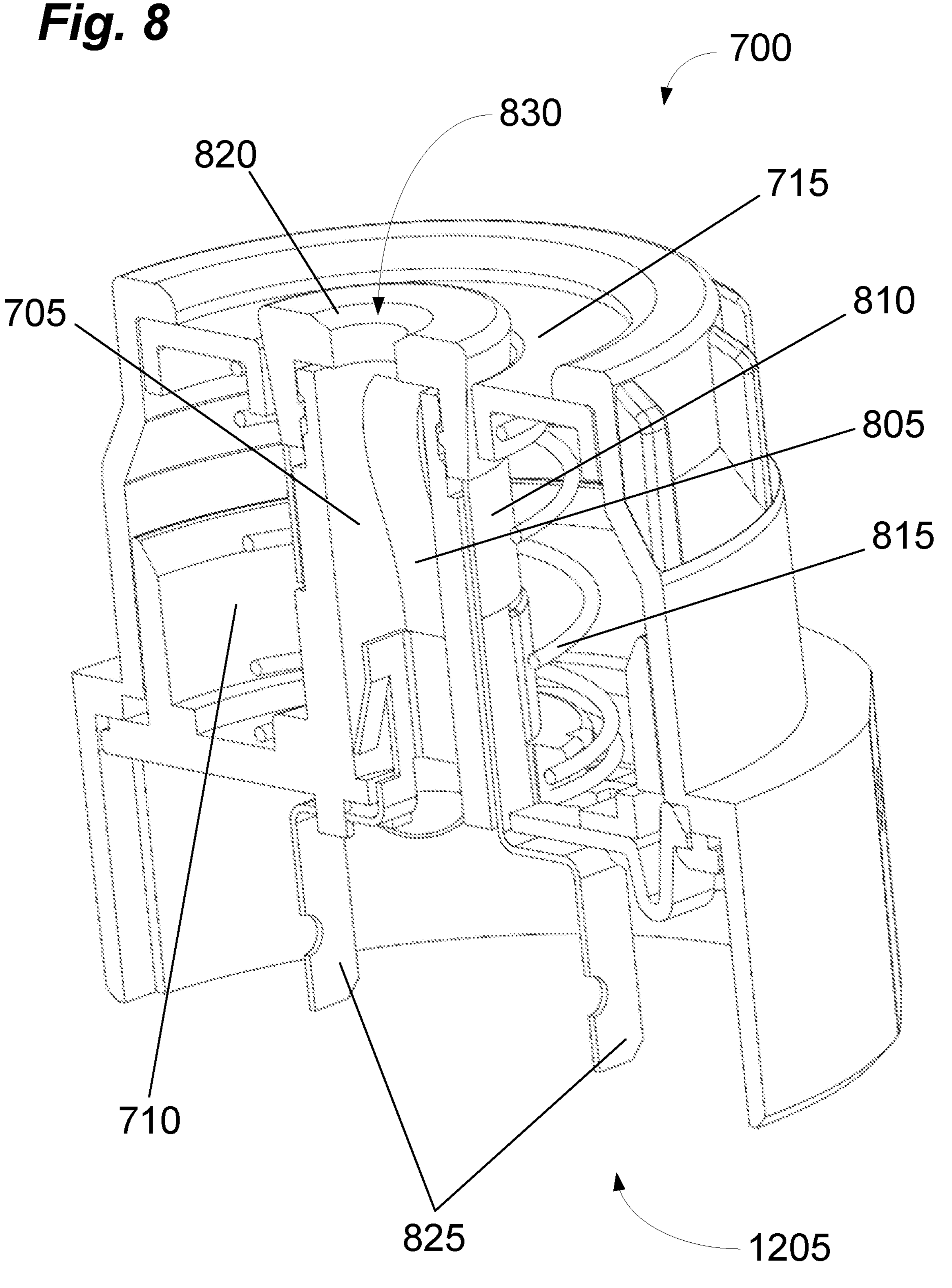
FIG. 8 depicts a perspective, cross-sectional view of a female end of a tree trunk section, in accordance with some embodiments of the present invention.

FIG. 8 shows a cross-section of a female end 700 of a power distribution subsystem 1205, such as the female end 700 shown in FIG. 7. The interior of the central receiving void 705 and channel receiving void 710 are shown. Also shown is central contact device 805 and channel contact device 810.

Central contact device 805 can be at least partially disposed within central receiving void 705, and can be designed to make electrical contact with a prong inserted into central receiving void 705. Similarly, channel contact device 810 can be at least partially disposed within channel receiving void 710, and can be designed to make electrical contact with a prong inserted into channel receiving void 710. In this manner, central contact device 805 and channel contact device 810 can conduct power from a male end to a female end 700, or from a female end 700 to a male end, of a power distribution subsystem.

Safety cover 715 and spring member 815 are also shown in FIG. 8. Safety cover 715 can provide a covering for channel receiving void 710 when the female end 700 is not engaged with a male end. The safety cover 715 can therefore prevent a person from inadvertently touching channel contact device 810, which could lead to electric shock. The safety cover 715 can also prevent various items from entering channel receiving void 710 and causing damage to or blocking access to the channel contact device 810. Safety cover 715 can be supported by spring member 815, which can apply a force to the safety cover 715 to obstruct access to the channel receiving void 710 when not in use. When a male end is joined with the female end 700, the prongs of the male end can push against the safety cover 715. This can cause the spring member 815 to flex and become depressed, depressing the safety cover 715, and thereby enabling access to channel receiving void 710 and channel contact device 810.

Female end 700 can further comprise a safety gate 820 at the opening of the central receiving void 705. The safety gate 820 can comprise an opening 830 that can be the same dimensions as, or nearly the same dimensions as, a prong of a male end that is inserted through the safety gate 820. In some embodiments, therefore, the opening 830 of the safety gate 820 can be too small to accommodate a finger, and can therefore prevent a user from inserting his or her finger into receiving void 705 and receiving an electric shock. The opening 830 can also be small enough to prevent insertion of many other foreign objects, such as metal kitchen utensils, for example.

Figure 9:
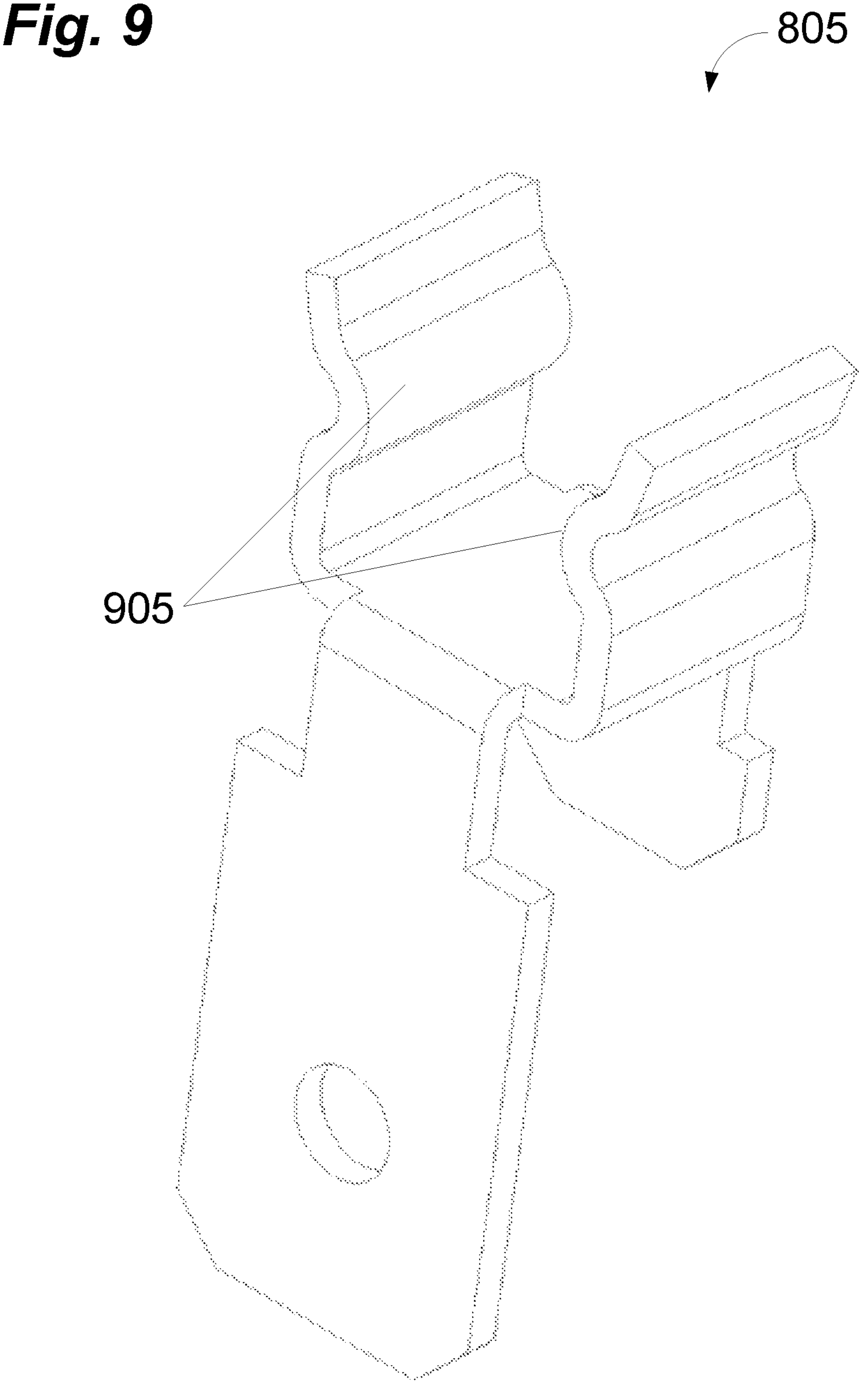
FIG. 9 depicts a central contact device with contact sections, in accordance with some embodiments of the present invention.

As shown in FIG. 9, in some embodiments, central contact device 805 can have one or more contact sections 905 that utilize spring action to make contact with a prong inserted into central receiving void 705. More specifically, the contact sections 905 can be configured such that they contact a prong as the prong is inserted into the central receiving void 705. As the prong is further inserted into the void, the prong can abut the contact sections 905, pushing the contact sections 905 outwardly, and causing the contact sections 905 to press against (i.e., spring back against) the prong. In this manner, the spring action of the contact sections 905 can ensure that the electrical connection between the contact sections 905 and the prong is effective to transfer electrical power. In addition, the contact sections 905 can be sufficiently large to ensure an effective electrical connection.

Figure 10:
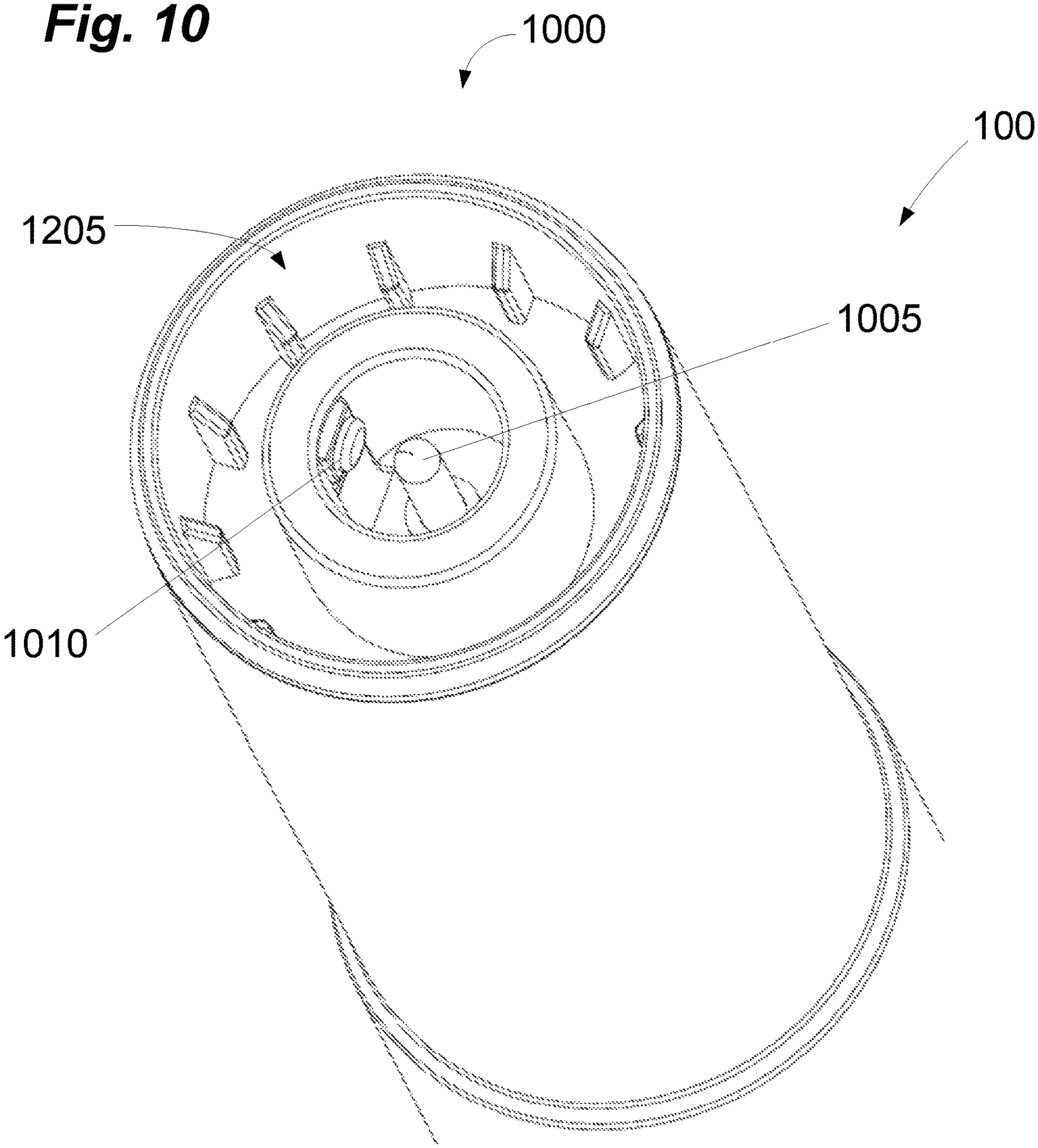
FIG. 10 depicts a perspective view of a male end of a tree trunk section, in accordance with some embodiments of the present invention.

FIG. 10 depicts an exemplary embodiment of a male end 1000 of a power distribution subsystem 1205 of a tree trunk section 100. Similar to previously described embodiments, male end 1000 can have one or more prongs for receiving power from, or distributing power to, a female end 700 of a tree trunk section 100. As shown in FIG. 10, male end 1000 can have a central male prong 1005 and a channel male prong 1010. In some embodiments, when the central male prong 1005 and channel male prong 1010 of the male end 1000 are inserted into the central receiving void 705 and channel receiving void 710 of the female end 700, respectively, electrical power can be conducted from male end 1000 to female end 700, or vice versa, depending on the direction of electrical power flow.

Figure 11:
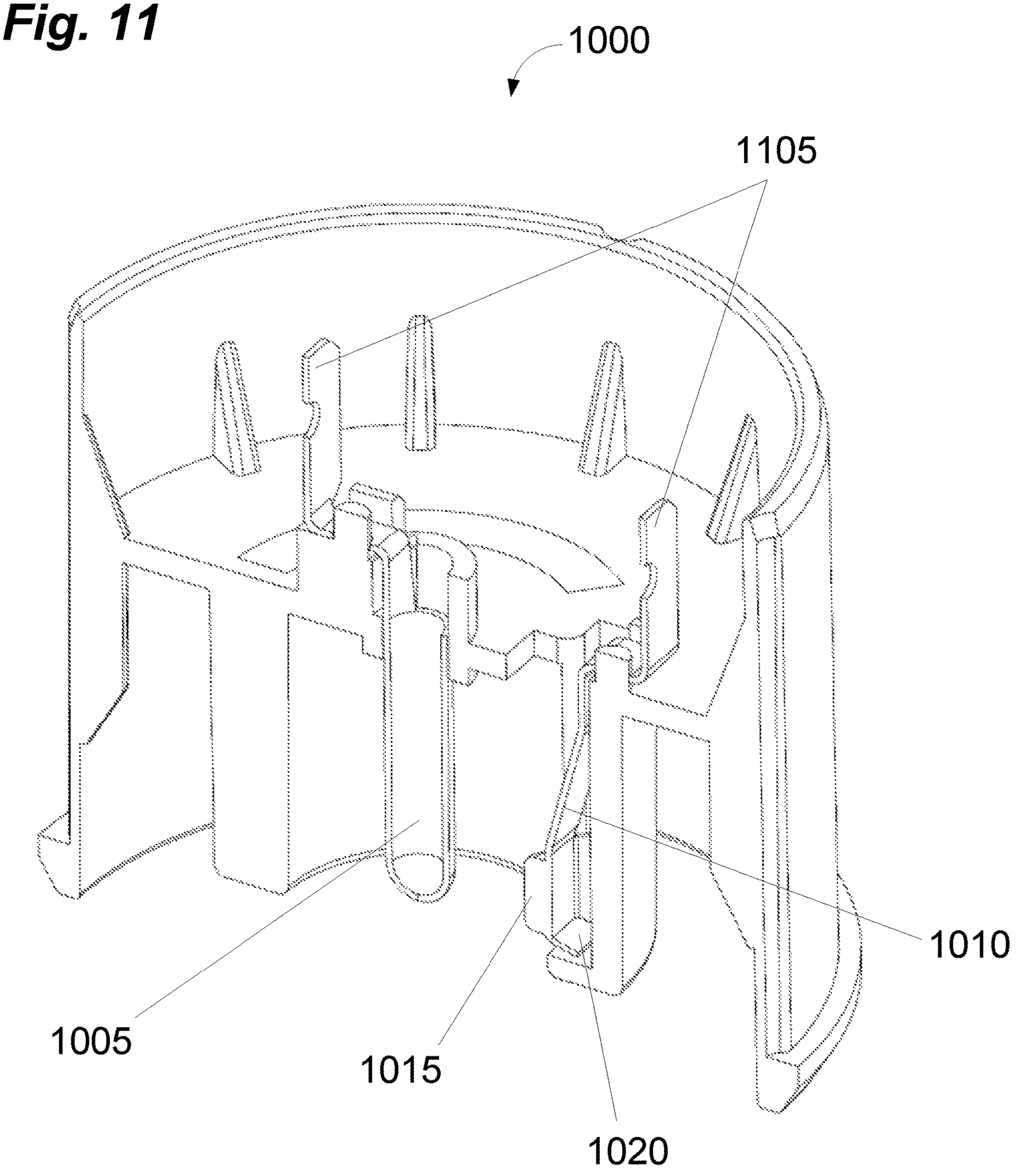
FIG. 11 depicts a perspective, cross-sectional view of a male end of a tree trunk section, in accordance with some embodiments of the present invention.

FIG. 11 shows a cross-section of a male end 1000 of a power distribution subsystem, such as the male end 1000 shown in FIG. 10. The central male prong 1005 and the channel male prong 1010 are both shown. In some embodiments, as shown in FIG. 11, the central male prong 1005 has a rounded end that enables the central male prong to engage and separate the contact sections 905 of the central contact device 805. In this manner, after being pushed apart, the contact sections 905 of the central contact device 805 can abut the central male prong 1005, providing an effective electrical connection.

In some embodiments, channel male prong 1010 can be a bendable prong that flexes as it makes contact with channel contact device 810. More specifically, channel male prong 1010 can flex inwardly and outwardly, as required, as it slides into channel receiving void 710 and abuts channel contact device 810. The channel male prong 1010 can be sufficiently resilient to flex, or spring toward channel contact device 810, thereby providing an effective electrical connection between the channel male prong 1010 and the channel contact device 810.

In some embodiments, the channel male prong 1010 can comprise a contact area 1015 that extends from the prong to engage the channel contact device 810, thereby facilitating contact between the channel male prong 1010 and the channel contact device 810. In some embodiments, the channel male prong 1010 can further comprise a pushing surface 1020. The pushing surface 1020 can be configured to apply a force to the safety cover 715, thereby depressing the safety cover 715 as the male end 1000 and the female end 700 are joined.

FIGS. 8 and 11 show that the male end 1000 of a power distribution subsystem and the female end 700 of a power distribution subsystem can comprise leads 825, 1105. The leads 825, 1105 can be electrically connected to one or more of the central male prong 1005, channel male prong 1010, central contact device 805, and channel contact device 810. In some embodiments, therefore, the leads 825, 1105 can electrically connect to wires of the power distribution subsystem 1205 to provide electrical connectivity between a male end 1000 and a female end 700 of a power distribution subsystem 1205.

Figures 12A, 12B:
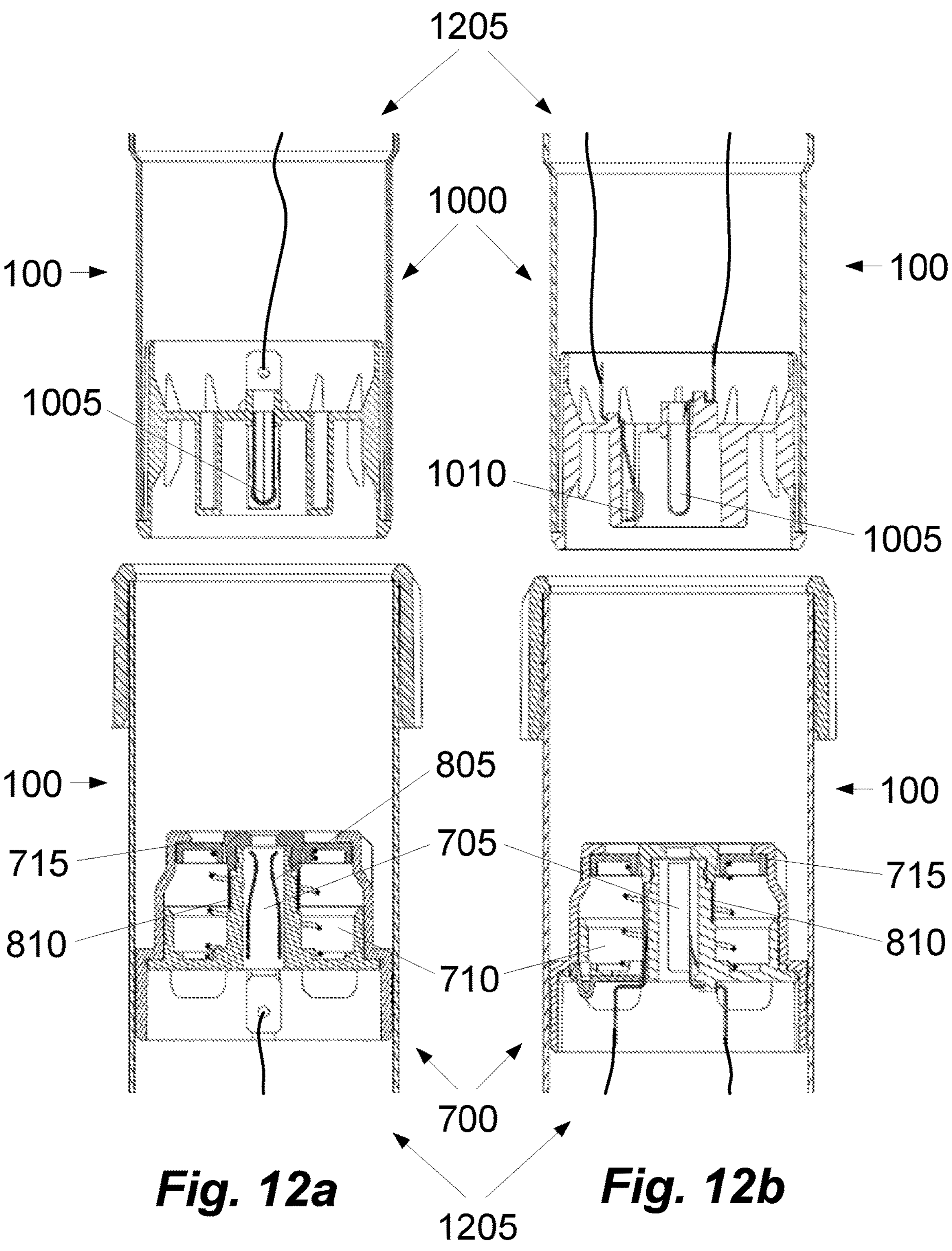
FIGS. 12*a-d* depict cross-sectional views of a female end of a tree trunk section being joined with a male end of a tree trunk section, in accordance with some embodiments of the present invention.
Figures 12C, 12D:
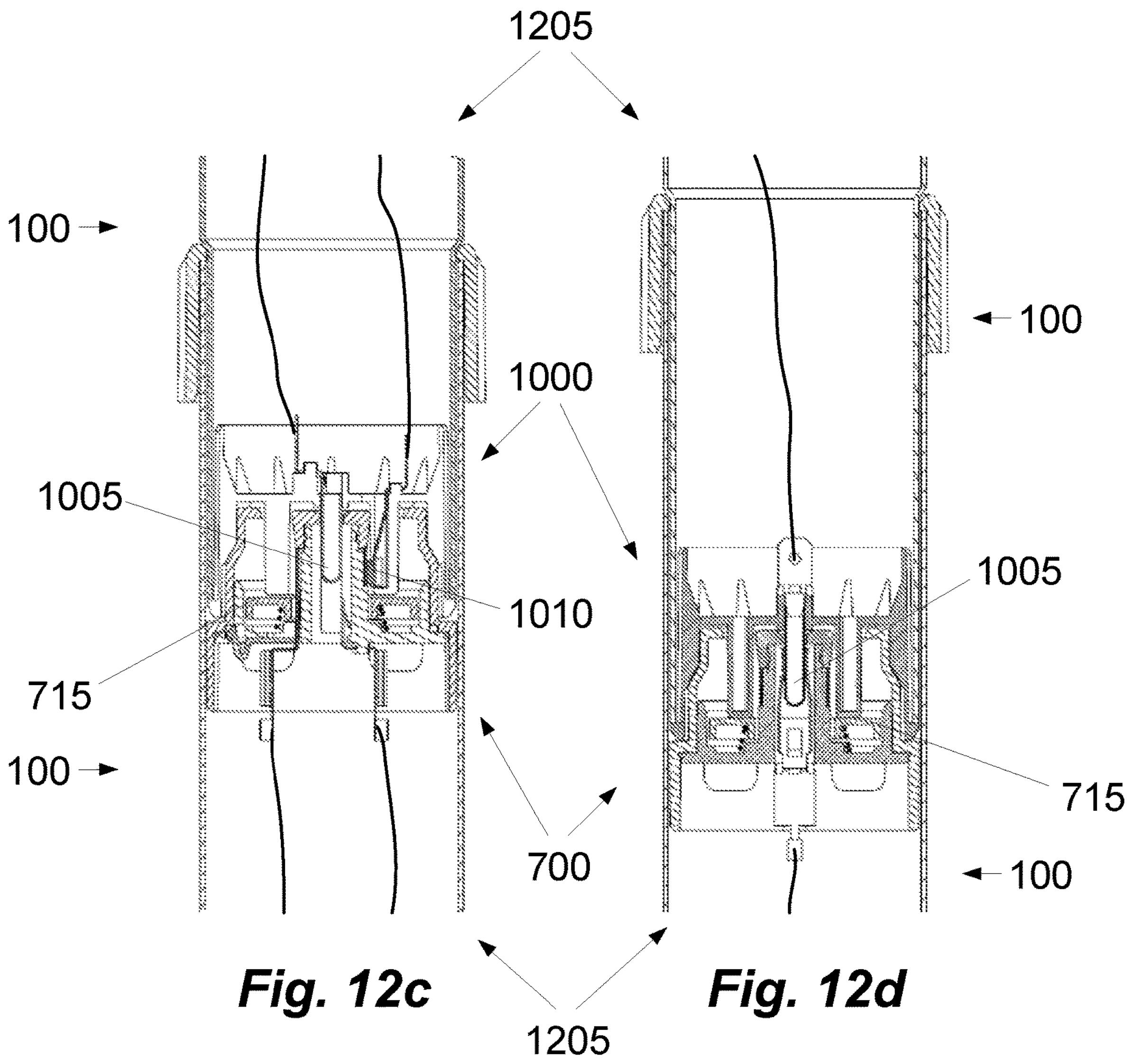

FIGS. 12*a-d* are cross-sections showing the connection of a male end 1000 of a power distribution subsystem 1205 with a female end 700 of a power distribution subsystem 1205. Referring to FIGS. 12*a* and 12*b*, illustrated are male end 1000 of a first tree trunk section 100 and female end 700 of a second tree trunk section 100 in a disconnected configuration. FIG. 12*a* shows a front cross-sectional view of this configuration, whereas FIG. 12*b* shows a side cross-sectional view. When assembling a tree, according to various embodiments of the present invention, the assembler can connect trunk sections 100 by connecting male end 1000 with female end 700. Initially, the assembler can vertically align the trunk sections 100, as shown in FIGS. 12*a-b*. Once vertically aligned, or at least sufficiently aligned to permit the adjoining, the assembler can move one trunk section 100 closer to the other trunk section 100 until the trunk sections 100 engage, as shown in FIGS. 12*c-d*. FIG. 12*c* shows a side cross-sectional view of this configuration, whereas FIG. 12*d* shows a front cross-sectional view. By connecting the male end 1000 and the female end 700 as described above, the assembler provides electrical connectivity between two power distribution subsystems 1205.

To provide effective electrical connectivity, in some embodiments, the center male prong 1005, the channel male prong 1010, the central contact device 805, and the channel contact device 810 can comprise electrically conductive material. In some embodiments, for example, the center male prong 1005, the channel male prong 1010, the central contact device 805, and the channel contact device 810 can comprise one or more of copper, copper alloy, or any other conductive material.

As shown in FIGS. 12*c* and 12*d*, when male end 1000 and female end 700 are joined, the safety cover 715 is depressed into an open position. This allows the channel male prong 1010 to enter the channel receiving void 710 and electrically contact the channel contact device 810. In addition, central male prong 1005 can contact the contact sections 905 of the central contact device 805, thereby completing the electrical connection between the male end 1000 and female end 700 of two power distribution subsystems 1205.

As described above, in some embodiments, channel receiving void 710 is disposed in a circular manner around central receiving void 705, alleviating any issues concerning the angular rotation of male end 1000 and female end 700 during assembly. More specifically, channel male prong 1010 can be inserted at any number of positions or locations along channel receiving void 710, and establish and maintain electrical connectivity between female end 700 and male end 1000.

Figure 13:
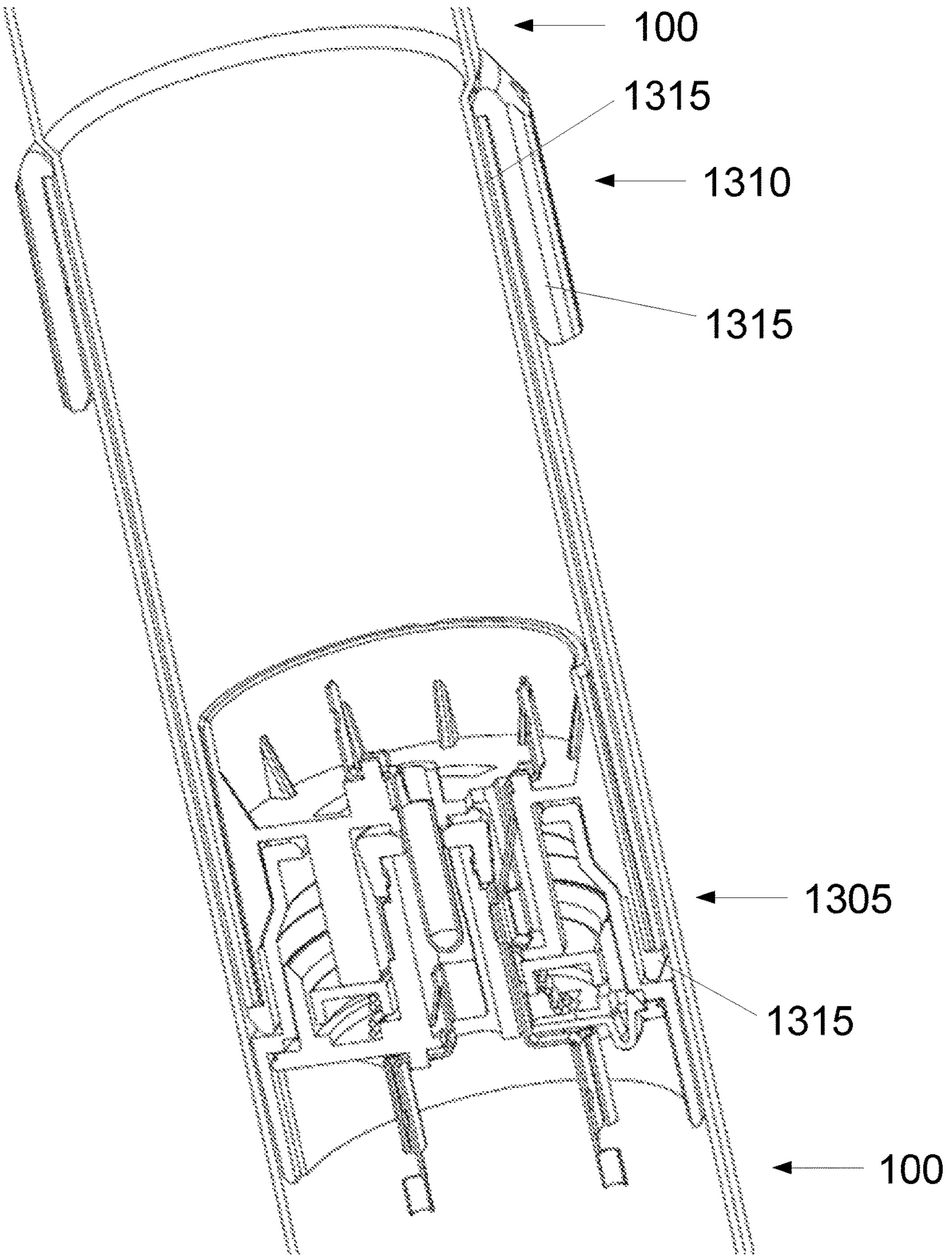
FIG. 13 depicts a perspective, cross-sectional view of a female end of a tree trunk section joined with a male end of a tree trunk section, in accordance with some embodiments of the present invention.

FIG. 13 shows a perspective, cross-sectional view of two joined trunk sections 100. In some embodiments, joined trunk sections 100 can comprise one or more pivot areas. A first pivot area 1305 can be disposed proximate the area where the male end 1000 and the female end 700 join. A second pivot area 1310 can be at a location proximate an area where the outer sleeve 1315 terminates. In some embodiments, the pivot areas can be areas where the inner sleeve 1320 and outer sleeve 1315 are in close contact. Thus, the inclusion of two pivot areas can prevent rocking of the trunk sections 100 when they are joined. This can be advantageous as it can enable the assembled tree maintain balance, thereby preventing the tree from unintentionally falling over.

Figure 14A:
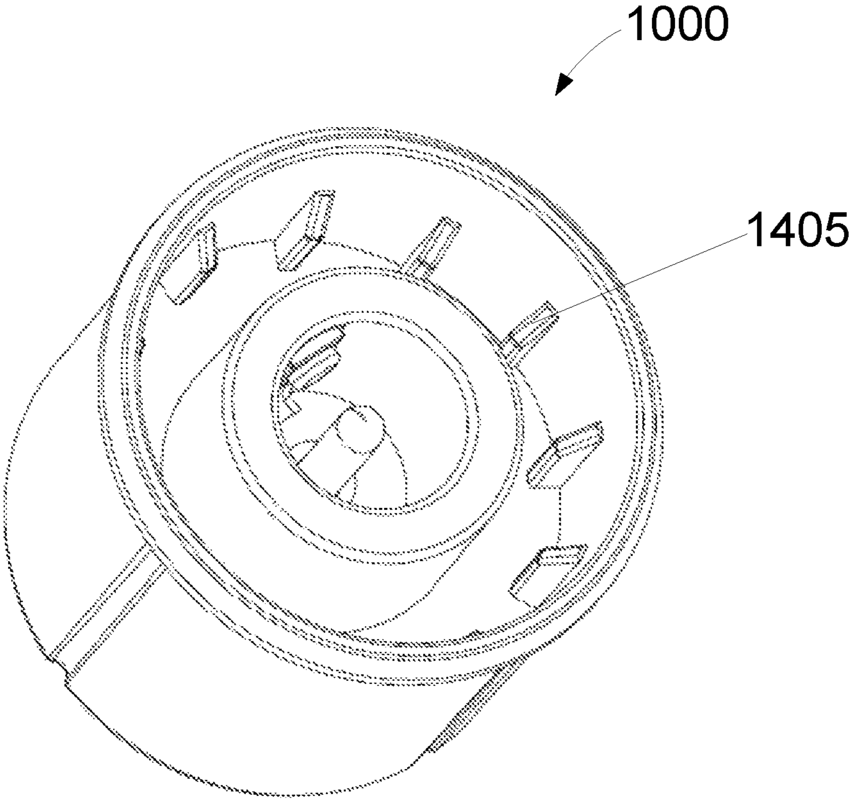
FIG. 14*a* depicts a perspective view of a male end of a tree trunk section with clutch elements, in accordance with some embodiments of the present invention.

FIG. 14*a* shows an exemplary embodiment of a male end 1000 of a power distribution subsystem 1205 of a tree trunk section 100. In some embodiments, the male end 1000 can comprise one or more first clutch elements 1405. In some embodiments, the first clutch elements 1405 can be protrusions that extend inwardly or outwardly proximate the sides of the male end 1000. In other embodiments, the first clutch elements 1405 can be detents, grooves, tabs, slots, and the like.

Figure 14B:
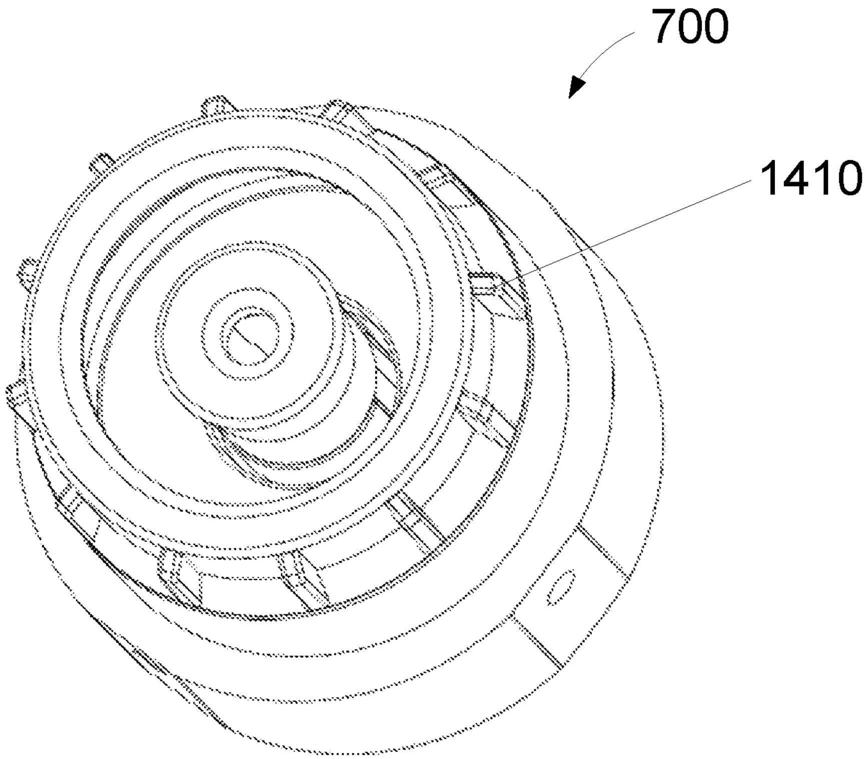
FIG. 14*b* depicts a perspective view of a female end of a tree trunk section with clutch elements, in accordance with some embodiments of the present invention.

FIG. 14*b* shows an exemplary embodiment of a female end 700 of a power distribution subsystem 1205 of a tree trunk section 100. As shown, the female end 700 can comprise one or more second clutch elements 1410. In some embodiments, the second clutch elements 1410 can be protrusions that extend inwardly or outwardly proximate the sides of the female end 700. In other embodiments, the second clutch elements 1410 can be detents, grooves, tabs, slots, and the like.

When two trunk sections 100 are joined, such that they are in electrical communication, the first clutch elements 1405 of the male end 1000 and the second clutch elements 1410 of the female end 700 can engage. The engaging clutch elements can prevent the two trunk sections 100 from rotating with respect to one another after tree assembly is complete. This can be advantageous as it can allow a user to align and maintain the trunk sections 100, and thus the branches of the tree, in a desired configuration. Accordingly, the trunk sections 100 and branches cannot later rotate out of configuration when the tree is decorated or otherwise touched, pulled, bumped, etc.

Figure 15:
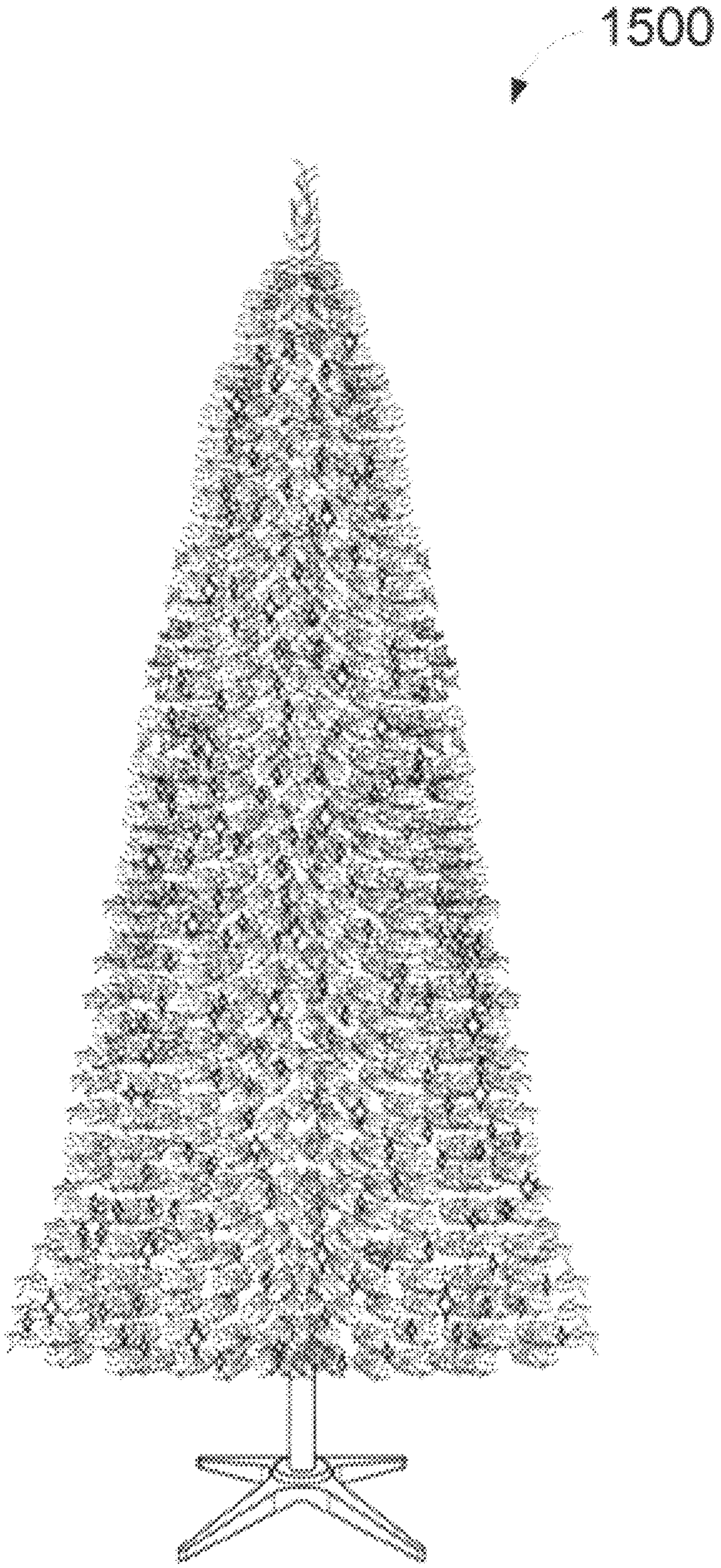
FIG. 15 depicts an assembled artificial Christmas tree, in accordance with some embodiments of the present invention.

FIG. 15 shows a completed tree 1500 in accordance with some embodiments of the present invention. The tree has been assembled by electrically connecting various trunk sections as described herein, and has been decorated in accordance with a user's liking.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

What is claimed is:

1. An artificial tree, comprising:

a first tree portion, including:
- a first trunk section having a first plurality of wires at least partially therein,
- a first plurality of branches connected to the first trunk section,
- a first light string distributed on the first plurality of branches and in electrical connection with the first plurality of wires, and
- a first electrical connector in electrical connection with the first plurality of wires and having a first plurality of ridges, the first plurality of ridges defining a plurality of gaps located between adjacent ridges of the plurality of ridges;

a second tree portion, including:
- a second trunk section,
- a second plurality of branches connected to the second trunk section,
- a second light string distributed on the second plurality of branches and in electrical connection with a second plurality of wires,
- a second electrical connector in electrical connection with the second plurality of wires and having a second plurality of ridges, and
- an outer sleeve secured to the second tree portion and the second electrical connector with a first fastener, the outer sleeve including a first end configured to receive a portion of the second trunk section and a second end configured to receive at least a portion of the second electrical connector, wherein the first electrical connector is configured to mechanically and electrically couple with the second electrical connector, such that each ridge of the second plurality of ridges is located in a gap of the plurality of gaps, thereby limiting rotation of the first electrical connector relative to the second electrical connector and also limiting rotation of the first tree portion relative to the second tree portion.

2. The artificial tree of claim 1, wherein the first electrical connector includes two electrical contacts, the two electrical contacts of the first electrical connector mechanically and electrically connected to the first plurality of wires inside the first trunk section, and wherein the second electrical connector includes two electrical contacts, the two electrical contacts of the second electrical connector mechanically and electrically connected to the second plurality of wires.

3. The artificial tree of claim 2, wherein one of the two electrical contacts of the first electrical connector comprises a cylindrical contact.

4. The artificial tree of claim 2, wherein the two electrical contacts of the first electrical connector are concentric about a central axis of the artificial tree.

5. The artificial tree of claim 2, wherein one of the two electrical contacts of the second electrical connector comprises a cylindrical contact.

6. The artificial tree of claim 2, wherein the two electrical contacts of the second electrical connector are concentric about a central axis of the artificial tree.

7. The artificial tree of claim 1, wherein the first tree portion further comprises an accessory plug configured to provide power to an artificial tree accessory.

8. The artificial tree of claim 1, wherein the second tree portion further comprises an accessory plug configured to provide power to an artificial tree accessory.

9. An artificial tree, comprising:

a first trunk section having a first plurality of wires at least partially disposed therein;

a first plurality of branches connected to the first trunk section;

a first light string distributed on the first plurality of branches and in electrical connection with the first plurality of wires;

a first electrical connector configured to be at least partially inserted into the first trunk section and having a first plurality of ridges;

a second trunk section having a second plurality of wires at least partially disposed therein;

a second plurality of branches connected to the second trunk section;

a second light string distributed on the second plurality of branches and in electrical connection with the second plurality of wires;

a second electrical connector configured to be at least partially inserted into the second trunk section, having a second plurality of ridges, and configured to mate with the first electrical connector;

a third electrical connector configured to be at least partially inserted into the second trunk section and having a third plurality of ridges;

a third trunk section;

a third plurality of branches connected to the third trunk section;

a third light string distributed on the third plurality of branches;

a fourth electrical connector configured to mate with the third electrical connector and having a fourth plurality of ridges; and an outer sleeve configured to receive at least a portion of the third trunk section and configured to connect to the fourth electrical connector, wherein the outer sleeve is secured to the third trunk section and the fourth electrical connector with a first fastener, wherein the first electrical connector is configured to mate with the second electrical connector, such that each ridge of the first plurality of ridges is located between adjacent ridges of the second plurality of ridges, and wherein the third electrical connector is configured to mate with the fourth electrical connector, such that each ridge of the third plurality of ridges is located between adjacent ridges of the fourth plurality of ridges.

10. The artificial tree of claim 9, wherein the outer sleeve is further secured to the third trunk section with a second fastener.

11. The artificial tree of claim 9, wherein the first electrical connector includes two electrical contacts, the two electrical contacts of the first electrical connector mechanically and electrically connected to the first plurality of wires inside the first trunk section, and wherein the second electrical connector includes two electrical contacts, the two electrical contacts of the second electrical connector mechanically and electrically connected to the second plurality of wires.

12. The artificial tree of claim 11, wherein one of the two electrical contacts of the first electrical connector comprises a cylindrical contact.

13. The artificial tree of claim 11, wherein the two electrical contacts of the first electrical connector are concentric about a central axis of the artificial tree.

14. The artificial tree of claim 11, wherein one of the two electrical contacts of the second electrical connector comprises a cylindrical contact.

15. The artificial tree of claim 11, wherein the two electrical contacts of the second electrical connector are concentric about a central axis of the artificial tree.

16. The artificial tree of claim 9, wherein the third trunk section includes a third plurality of wires, and wherein the third trunk section further comprises an accessory plug electrically connected to the third plurality of wires and configured to provide power to an artificial tree accessory.

* * * * *